United States Patent [19]
Terasawa et al.

[11] Patent Number: 5,191,475
[45] Date of Patent: Mar. 2, 1993

[54] ZOOM LENS

[75] Inventors: Chiaki Terasawa, Kanagawa; Jun Hosoya, Tokyo; Kiyoshi Fukami, Kanagawa, all of Japan

[73] Assignee: Canon Kabushiki Kaisha, Tokyo, Japan

[21] Appl. No.: 804,513

[22] Filed: Dec. 10, 1991

Related U.S. Application Data

[63] Continuation of Ser. No. 475,760, Feb. 6, 1990, abandoned.

[30] Foreign Application Priority Data

Feb. 9, 1989 [JP] Japan .................................. 1-032389
Feb. 28, 1989 [JP] Japan .................................. 1-048909

[51] Int. Cl.$^5$ .............................................. G02B 15/14
[52] U.S. Cl. .................................... 359/684; 359/693; 359/676
[58] Field of Search ............... 350/423, 427, 428, 430; 359/684, 693, 676

[56] References Cited

U.S. PATENT DOCUMENTS

| | | | |
|---|---|---|---|
| 4,516,839 | 5/1985 | Tokumaru | 350/428 |
| 4,712,883 | 12/1987 | Kato et al. | 359/684 |
| 4,776,682 | 10/1088 | Hosoya | 350/464 |
| 4,854,681 | 8/1989 | Kato et al. | 350/427 |
| 4,854,684 | 8/1989 | Horiuchi | 350/427 |
| 4,859,042 | 8/1989 | Tanaka | 350/423 |

FOREIGN PATENT DOCUMENTS 58-1401 1/1983 Japan .

Primary Examiner—Bruce Y. Arnold
Assistant Examiner—Hung Xuan Dang
Attorney, Agent, or Firm—Fitzpatrick, Cella, Harper & Scinto

[57] ABSTRACT

A zoom lens comprising, from front to rear, a focusing lens group, a variator lens group, a compensator lens group and a relay lens group, the relay lens group consisting of a front part and a rear part with a longest air spacing therebetween, and the rear part including a first movable lens component arranged upon setting of macro photography made to move along an optical axis, and a second movable lens component arranged upon setting of tracking adjustment made to move along the optical axis.

10 Claims, 19 Drawing Sheets

ZOOM LENS

This application is a continuation of application Ser. No. 07/475,760 filed Feb. 6, 1990, now abandoned.

BACKGROUND OF THE INVENTION

1. Field of the Invention

This invention relates to zoom lenses for television cameras and, more particularly, to zoom lenses capable of macro photography and tracking adjustment.

2. Description of the Related Art

As the lens for television is releasably attached to the camera body, the sharp image plane of the lens has, despite interchanging of it, to be brought into coincidence with the image receiving surface of the pickup device in the camera body. For this purpose, it has already been known to provide a technique that moves the relay lens group of the zoom lens, or the so-called "tracking" adjustment.

It is also known to provide a technique of making macro photography by moving the relay lens group.

By the way, to make it possible to use the same relay lens in both macro photography and tracking adjustment, Japanese Patent Publication No. Sho 58-1401 proposes a technique that after it has once been moved to make macro photography, the relay lens group returns to the original tracking adjusted position again in automatic response to transition to the normal photography mode.

In the above-described Japanese Patent Publication No. Sho 58-1401, however, for only one lens group, in this instance, the relay lens is made to perform the dual function, there is need to employ the operating mechanism for macro photography, the tracking control mechanism, and further a mechanism for coordinating these two mechanisms with each other.

The use of such a technique, therefore, not only involves great increases of the complexity of mechanical structure and the size of the casing therefor, but also requires a high precision accuracy in each of the mechanisms and another mechanism for returning the lens group for tracking to the adjusted position.

SUMMARY OF THE INVENTION

An object of the invention is to provide a photographic optical system which has overcome the above-described problem.

And, the spirit and scope of the invention resides in a photographic lens comprising, from front to rear, lens groups including those for focusing and zooming and a relay lens group which fulfills the image forming function and is constructed from front and rear parts spaced from each other by a longest axial distance, wherein the aforesaid rear part of the relay lens group is provided with a first movable lens member which moves along an optical axis when in macro photography and a second movable lens member which moves along the optical axis for the purpose of tracking adjustment, and an appropriate power arrangement is set up over these members.

Of the aberration graphs, the figure numbers suffixed (A) represent the aberrations in the wide-angle end with an object at infinity, the numbers suffixed (B) the aberrations in the telephoto end with an object at infinity, the numbers suffixed (C) the aberrations in the wide-angle end when in macro photography, and the number suffixed (D) the aberrations in the wide-angle end with an object at infinity when in tracking adjustment. Also, M represents the meridional image surface, and S the sagittal image surface.

Figure 5A:
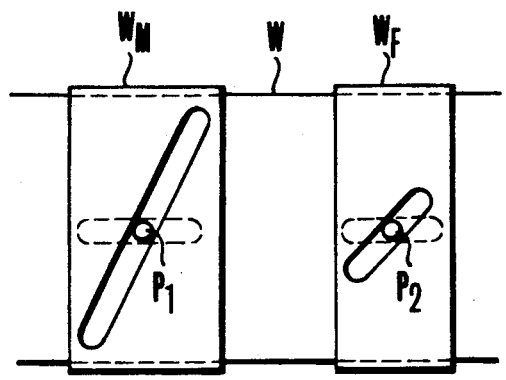
Figure 5B:
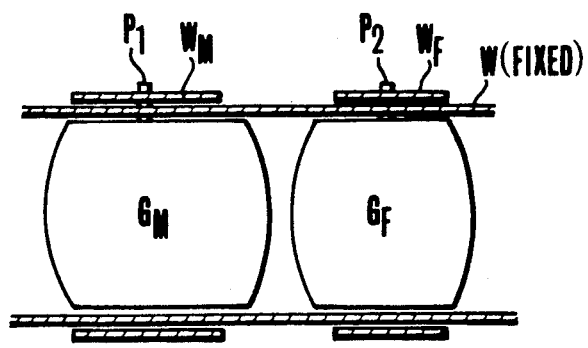
Figure 6:
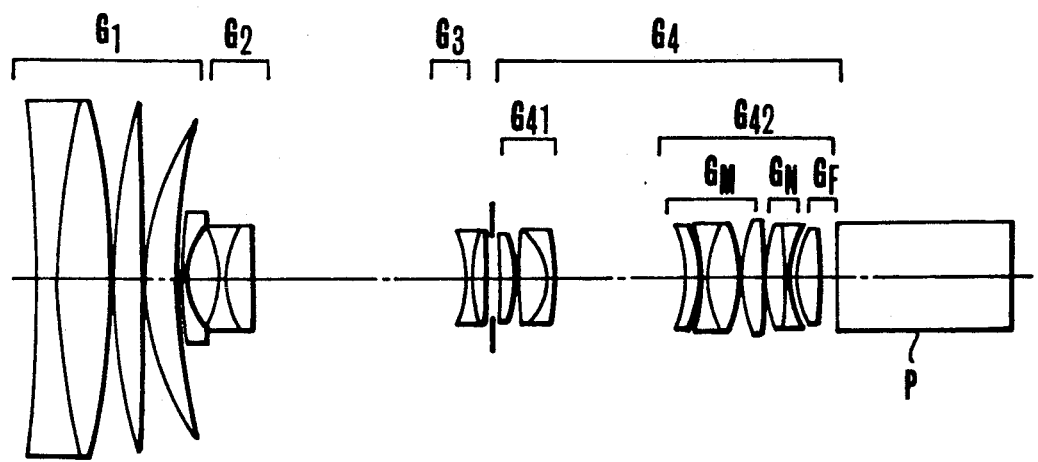
Figure 7A:
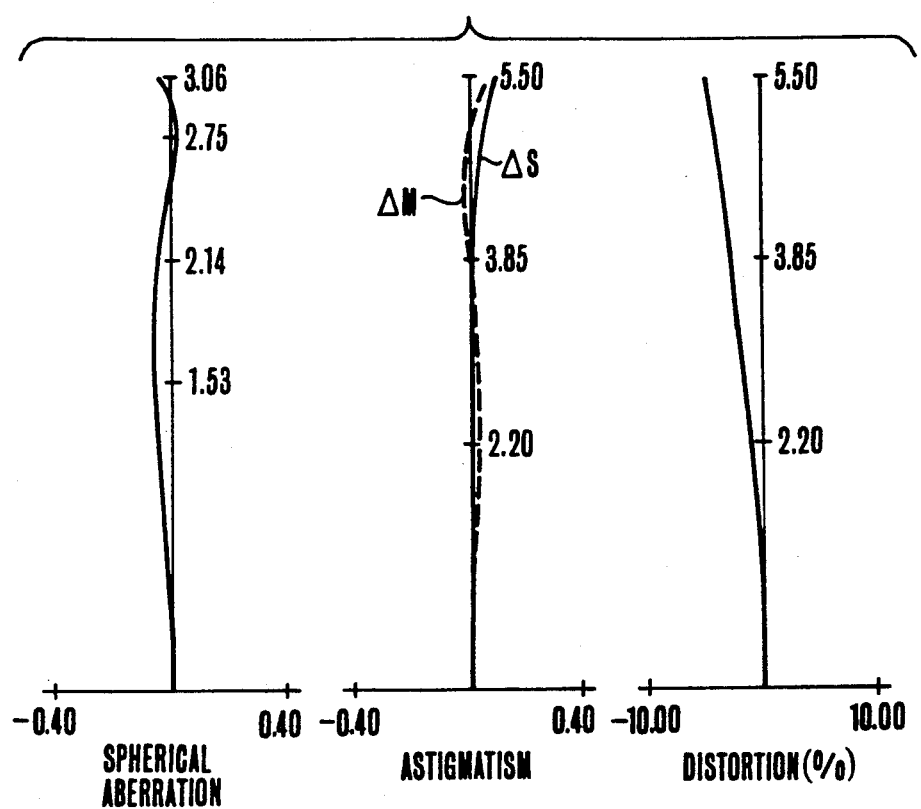
Figure 7B:
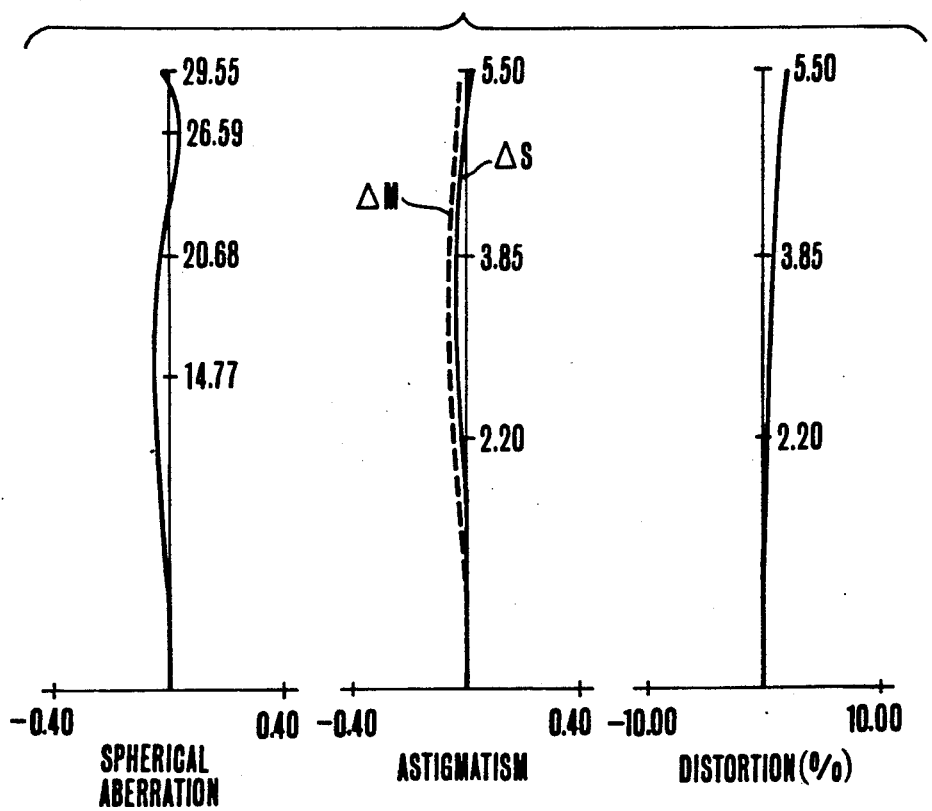
Figure 7C:
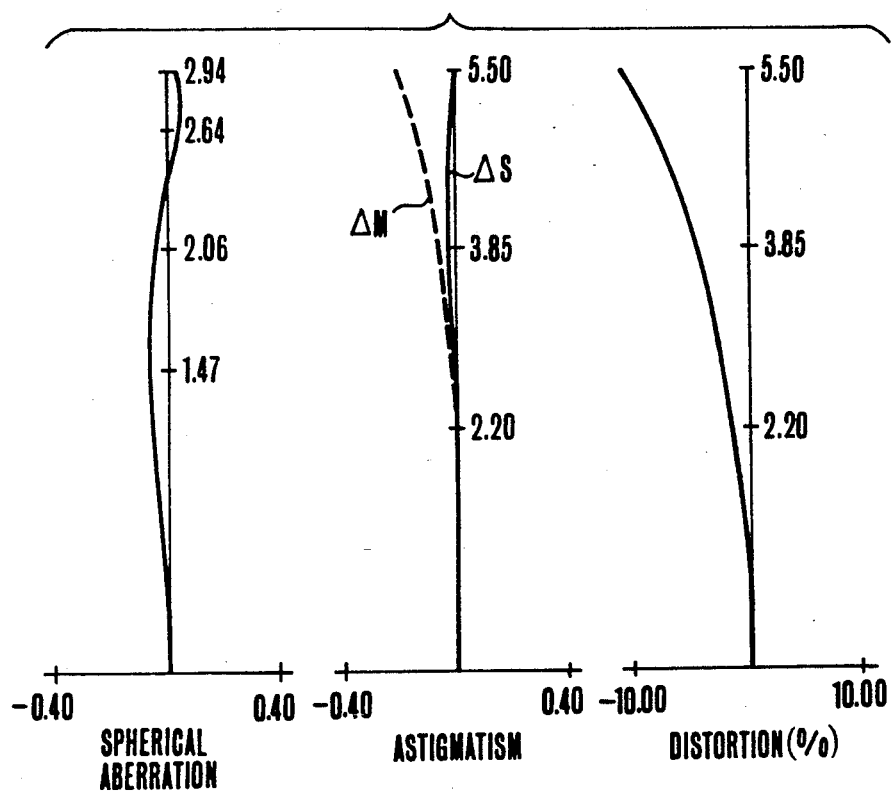
Figure 7D:
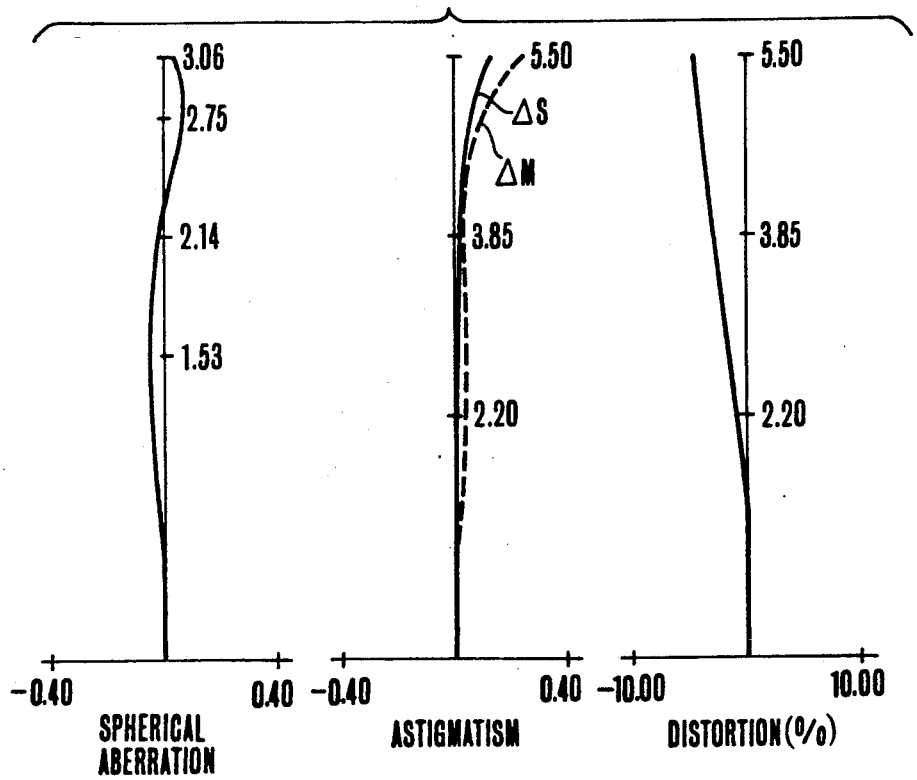
Figure 8:
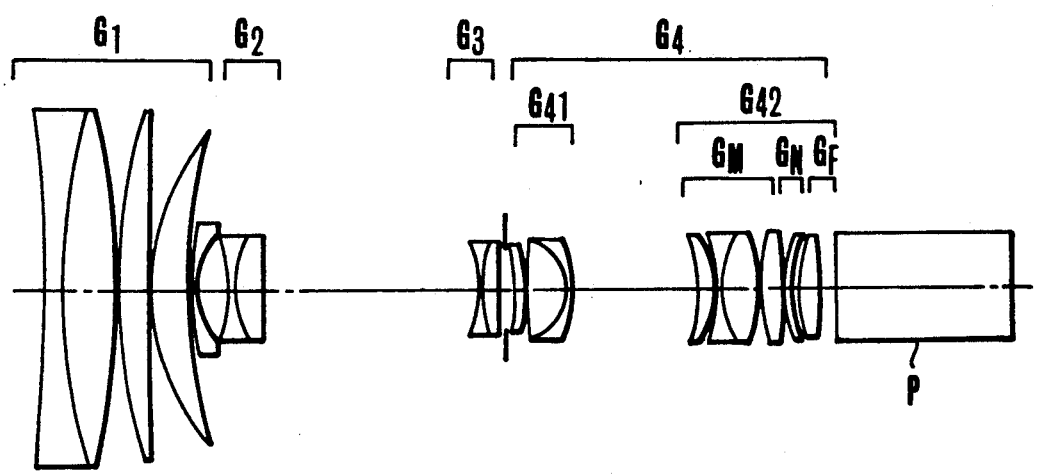
Figure 9A:
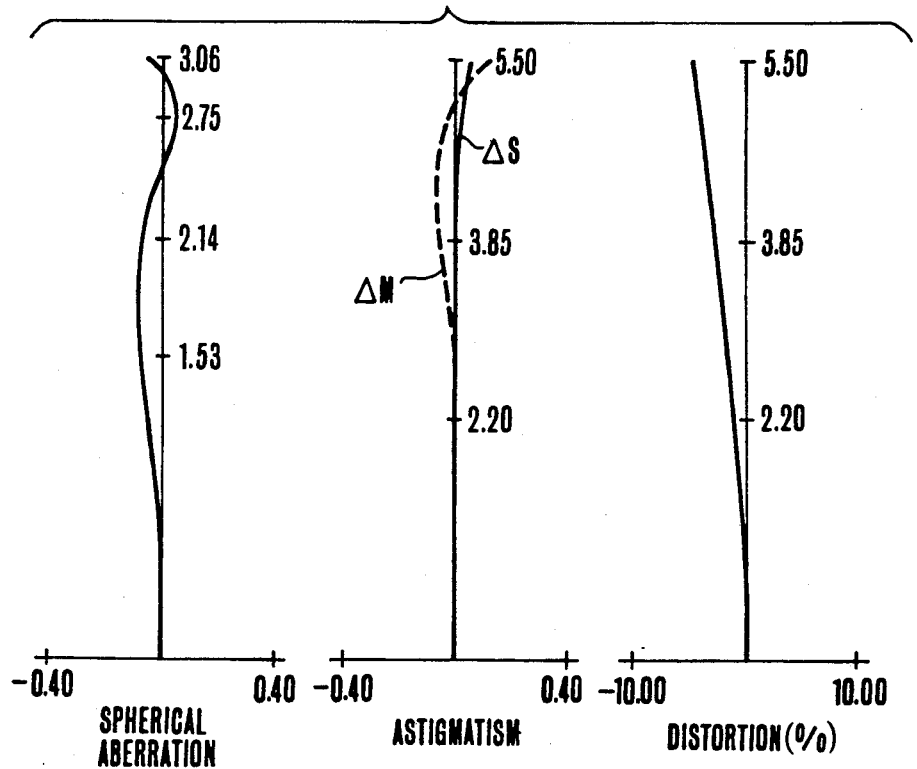
Figure 9B:
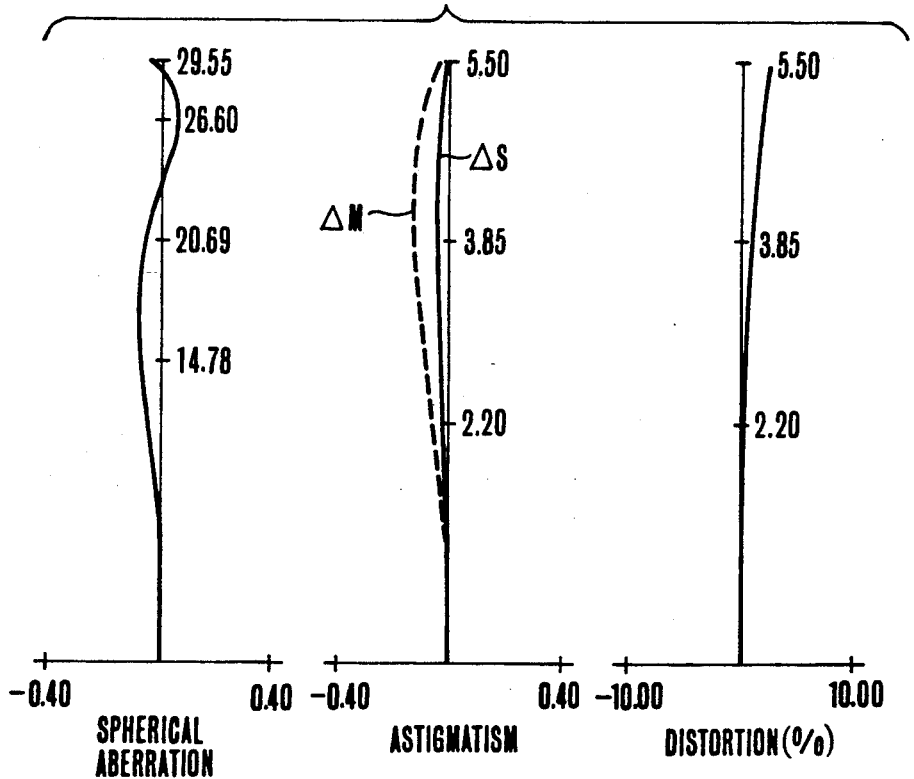
Figure 9C:
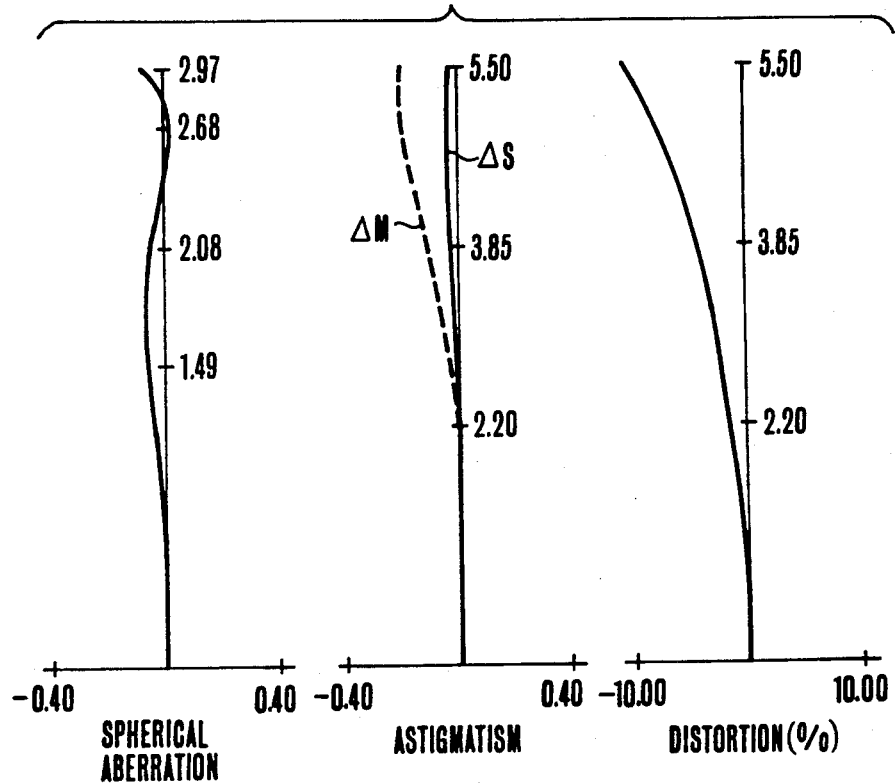
Figure 9D:
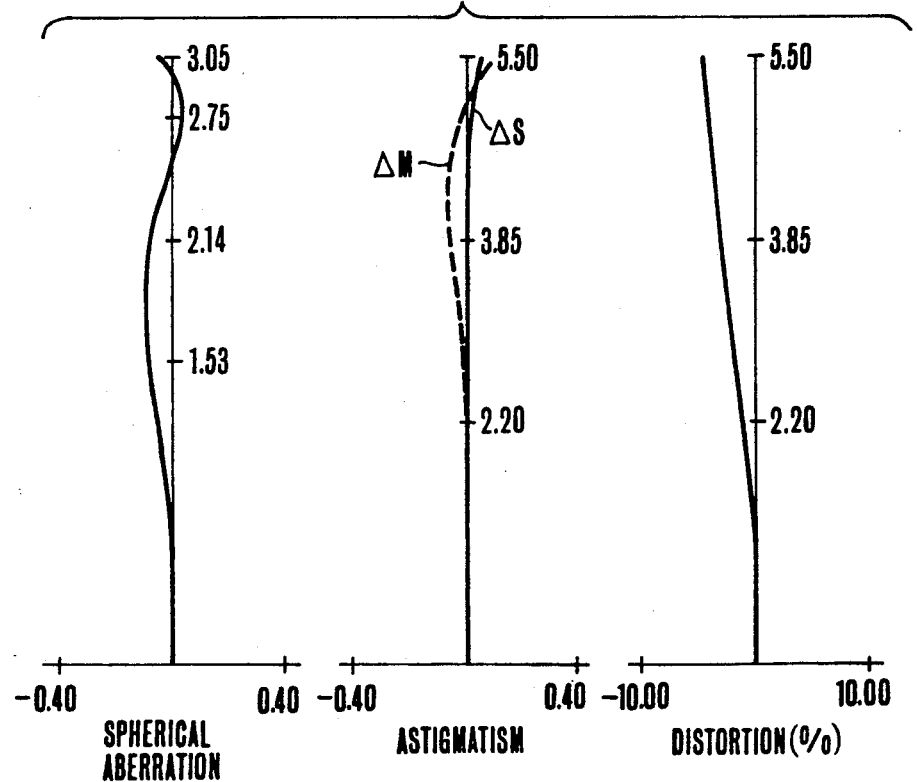

FIGS. 5(A) and 5(B) illustrate a mounting mechanism for the lens of the invention.

DETAILED DESCRIPTION OF THE PREFERRED EMBODIMENTS

Figure 1:
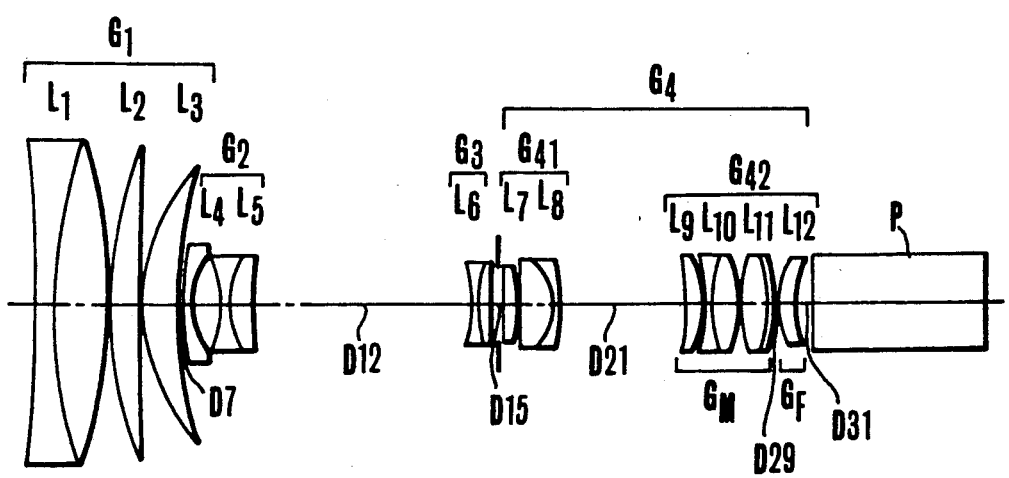
FIG. 1, FIG. 3, FIG. 6, FIG. 8, FIG. 10 and FIG. 12 are longitudinal section views of numerical examples 1 to 6 of zoom lenses of the invention respectively.
Figure 2A:
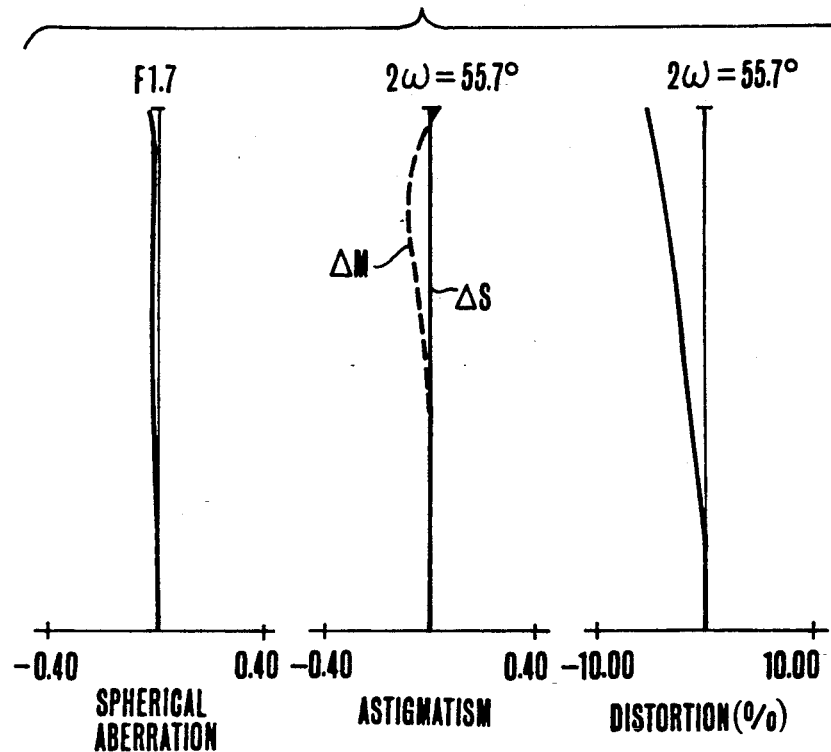
FIGS. 2(A), 2(B), 2(C) and 2(D), FIGS. 4(A), 4(B), 4(C) and 4(D), FIGS. 7(A), 7(B), 7(C) and 7(D), FIGS. 9(A), 9(B), 9(C) and 9(D), FIGS. 11(A), 11(B), 11(C) and 11(D) and FIGS. 13(A), 13(B), 13(C) and 13(D) are graphic representations of the aberrations of the numerical examples 1 to 6 respectively.
Figure 2B:
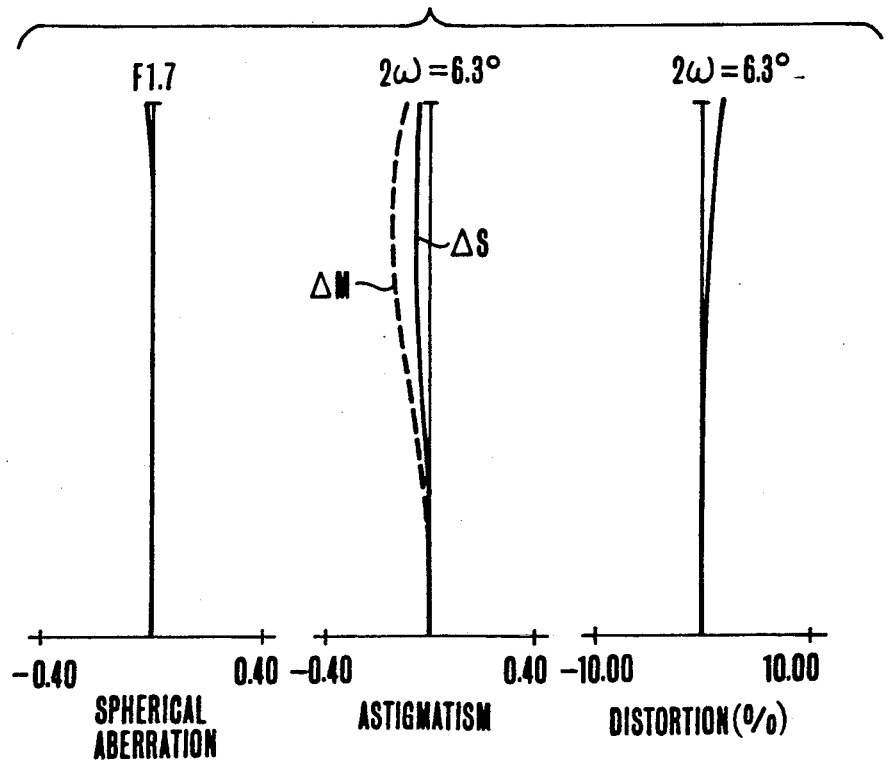
Figure 2C:
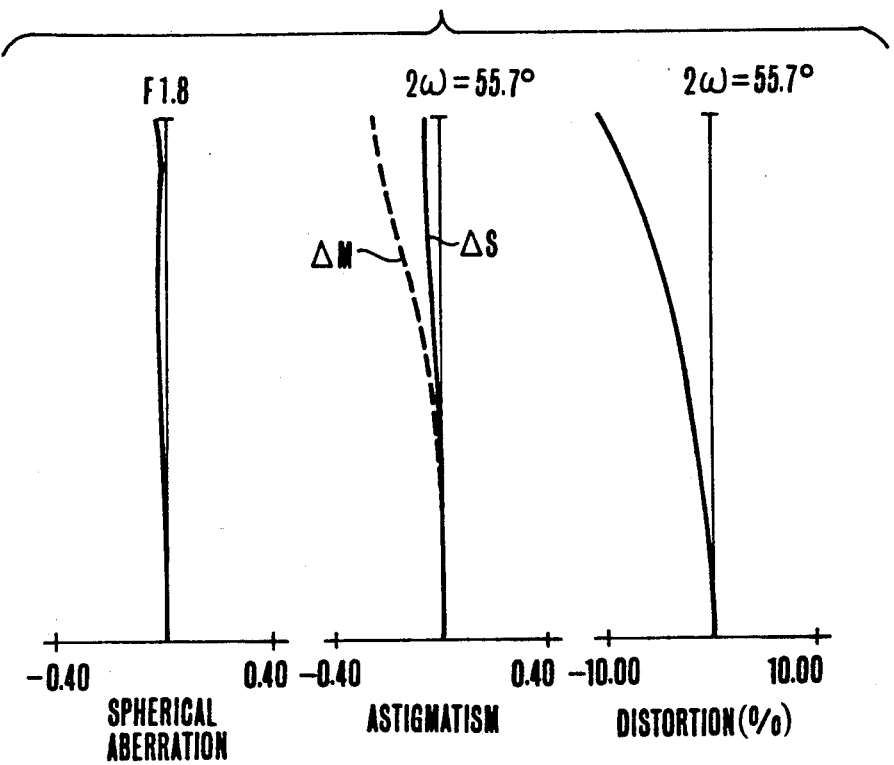
Figure 2D:
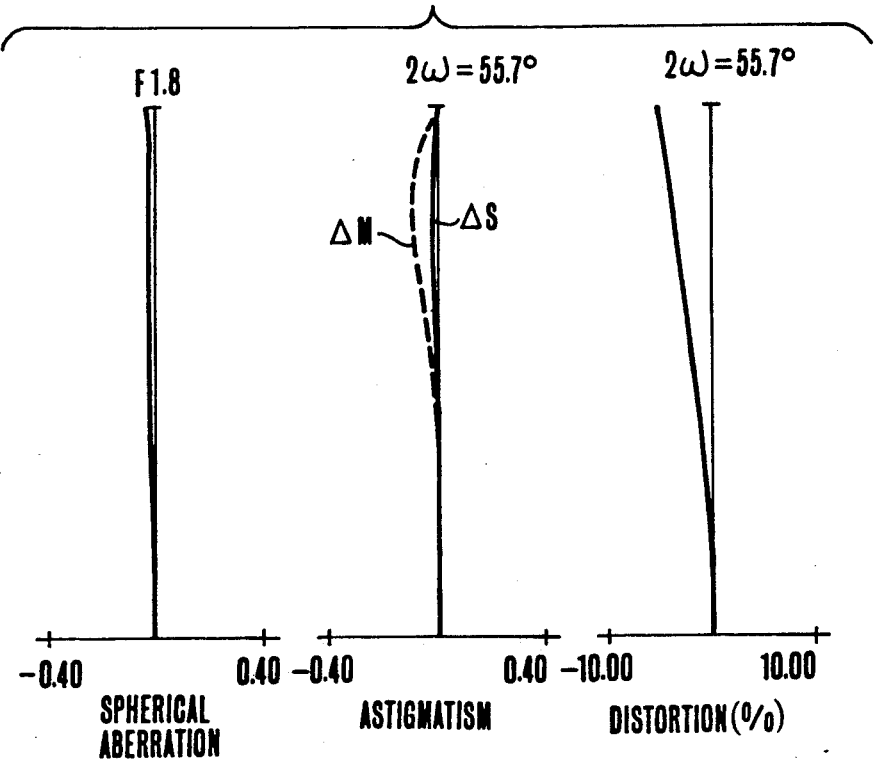
Figure 3:
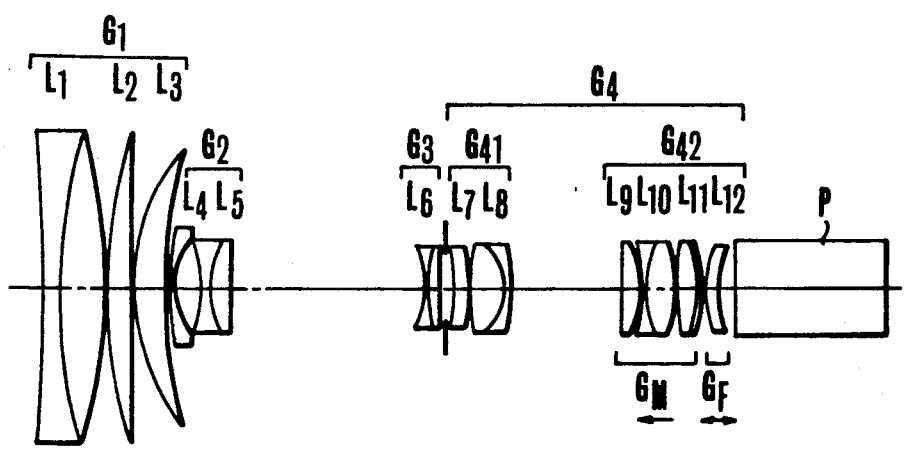
Figure 4A:
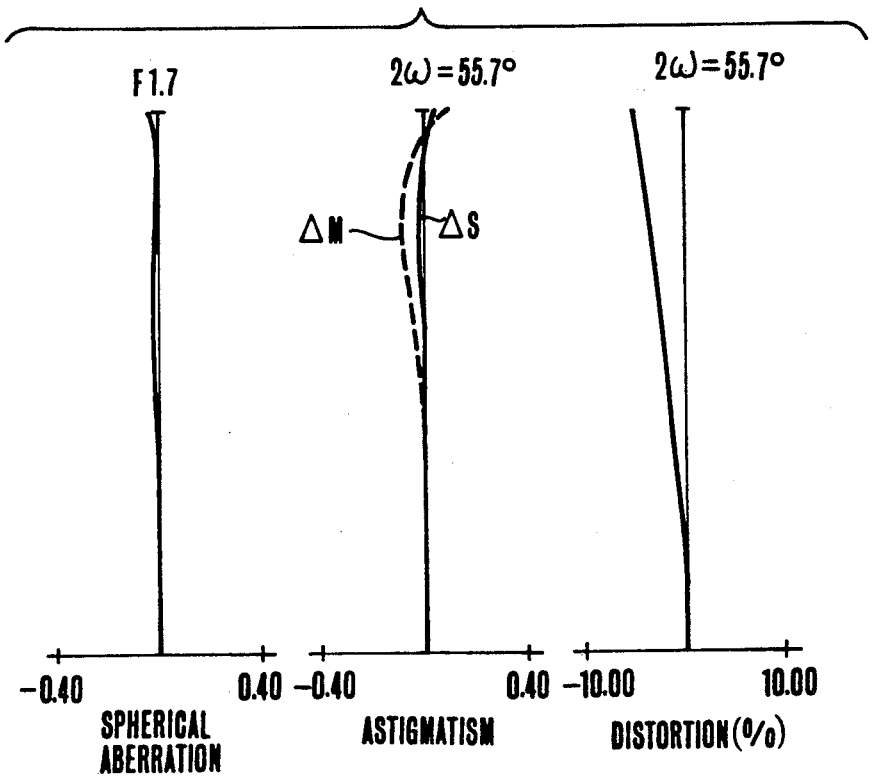
Figure 4B:
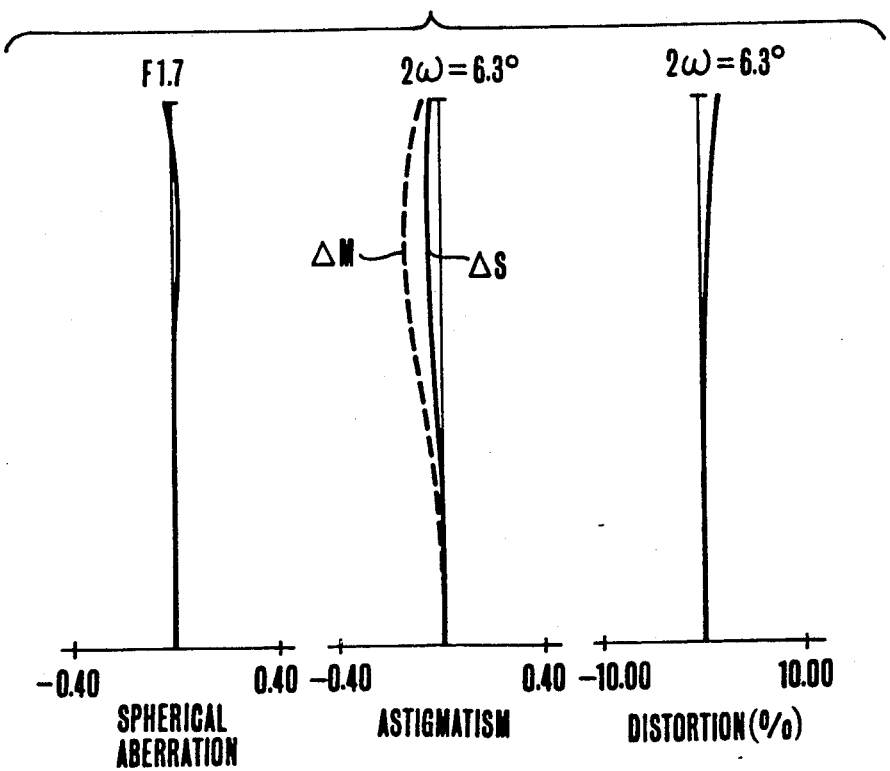
Figure 4C:
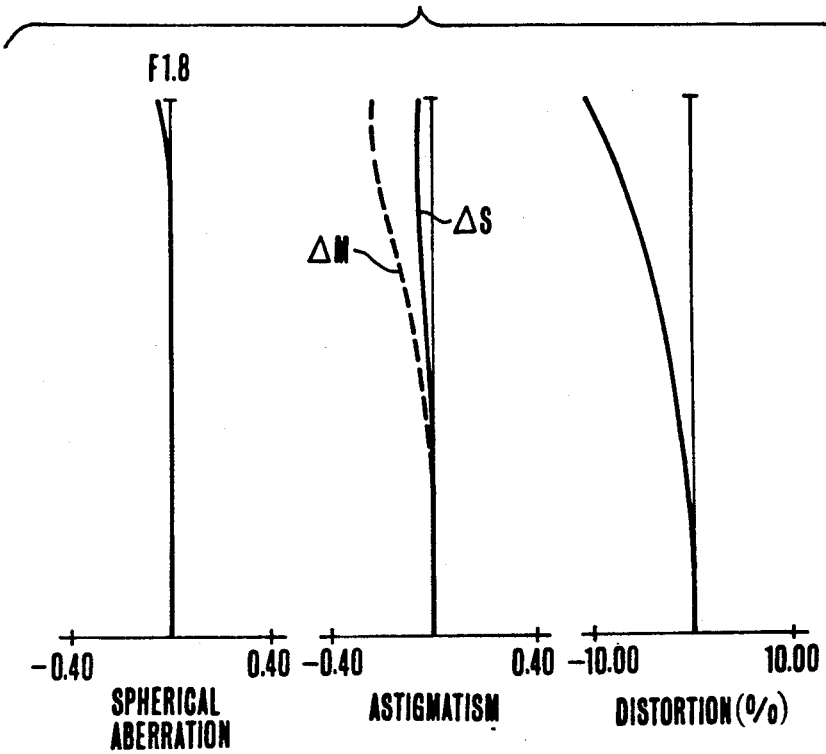
Figure 4D:
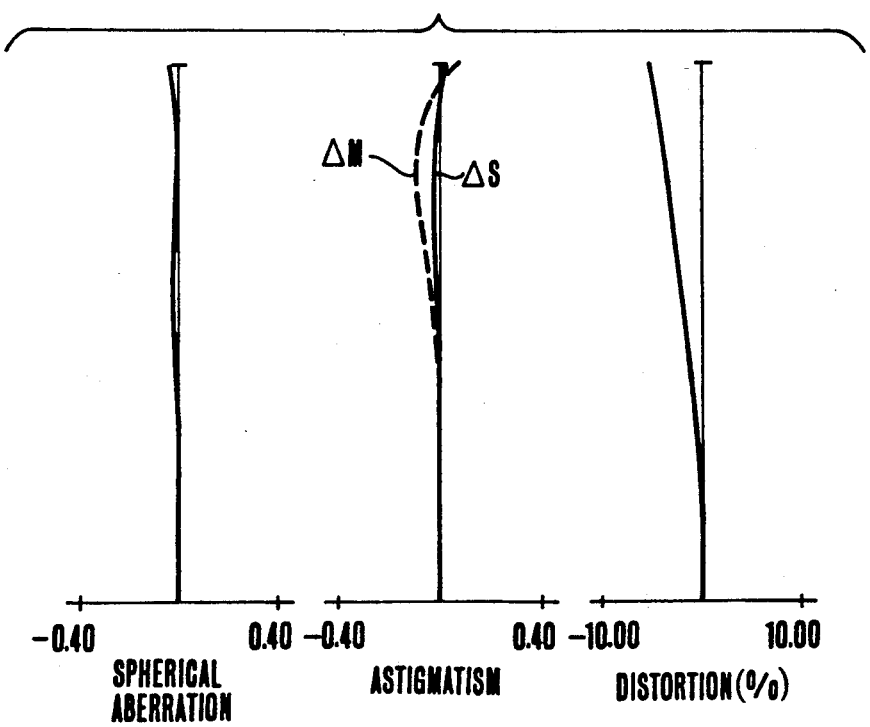

FIG. 1 and FIG. 3 in block diagram show a specific embodiment of a zoom lens according to the invention, comprising, from front to rear, a focusing lens group $G_1$ having a positive refractive power and axially movable for focusing purposes, zoom lens groups $G_2$ and $G_3$, of which the lens group $G_2$ has a negative refractive power and, when zooming, moves along a common optical axis to fulfill the function of the variator and the lens group $G_3$ has a negative refractive power and moves to fulfill the function of the compensator for the shift of an image plane with zooming, and a relay lens group $G_4$ which fulfills the image forming function. This relay lens group $G_4$ is constructed in such a form that the longest air separation in the relay lens group intervenes when a relay front lens group $G_{41}$ is arranged on the object side and a relay rear lens group $G_{42}$ on the image side. It should be noted that this spacing between the front lens group $G_{41}$ and the rear lens group $G_{42}$ is usable for putting an extender or like optical member in. Again, in the present embodiment, the front lens group $G_{41}$ and the rear lens group $G_{42}$ both have positive refractive powers. Incidentally, in the lens block diagrams, P represents an equivalent to the color separation prism.

For the relay lens group $G_4$, its rear group $G_{42}$ which is relevant to the invention is made up of, from front to rear, a first movable lens group $G_M$ having a positive refractive power and arranged upon making of macro photography to move along an optical axis, and a second movable lens group $G_F$ having a positive refractive power and arranged upon tracking adjustment to move along the optical axis.

It should be pointed out that the first movable lens group $G_M$ and the second movable lens group $G_F$ move along respective individual camming slots, or a camming slot for macro photography and a camming slot for tracking adjustment respectively, provided in the lens barrel, as will be described more fully later.

In such a manner, the macro focusing movement and the tracking movement are controlled independently of each other. In the invention, therefore, the necessity of using the coordination control mechanism as in the prior art is obviated, and no increase of the complexity of structure is involved.

Now, it is next required that whilst minimizing the size of that optical system which is relevant to the invention, good optical performance is preserved. With this, particularly when moving the first and second movable lens groups $G_M$ and $G_F$, good stability of aberration correction must be maintained. For this, a condition is set forth as follows:

That is, letting the focal lengths of the aforesaid rear lens group $G_{42}$ of the relay lens group and the aforesaid first movable lens group $G_M$ be denoted by $f_R$ and $f_M$ respectively, the following condition:

$$1.2 < f_M/f_R < 1.9 \qquad (1)$$

is satisfied.

The above-described inequalities of condition (1) concern with the relationship between the focal length $f_M$ of the first movable lens group $G_M$ for use in macro photography and the focal length $f_R$ of the rear group $G_{42}$ of the relay lens group and has an aim to set up so appropriate power in the first movable lens group $G_M$ that a minimization of the size of the lens system is achieved while still permitting good balance of aberrations to be stabilized over the considerably extended close-up range, or macro focusing range and the entire range of tracking adjustment. When the lower limit is exceeded, it becomes difficult to suppress the variation of spherical aberration, coma and curvature of field with macro focusing or tracking adjustment, because the power of the first movable lens group $G_M$ is too strong. When the upper limit is exceeded, on the other hand, the total macro focusing movement of the first movable lens group $G_M$ becomes too long, which in turn causes the size of the entire lens system to increase largely.

It is recommended in the present embodiment that the aforesaid first movable lens group $G_M$ is constructed as comprising, from front to rear, a positive meniscus lens convex toward the rear, a cemented doublet consisting of a negative lens of concave front curvature and a positive lens, and another cemented doublet consisting of a positive lens and a negative lens, these lenses being given refractive powers which are summed up to a positive refractive power. It is also recommended that the second movable lens group $G_F$ is constructed in the form of a positive lens whose front surface is convex. This lens group $G_F$ may be a cemented doublet consisting of a positive lens and a negative lens.

Referring next to FIGS. 5(A) and 5(B), an operating mechanism for the movable lens groups is briefly described. Incidentally, FIG. 5(B) is a cross-sectional view taken along a line λ of FIG. 5(A).

A fixed tube W holds stationary lenses $G_P$ and $G_N$, etc. and has linear guide slots cut through the wall thereof in parallel to the optical axis for macro focusing and tracking purposes. Rotatable sleeves $W_M$ and $W_F$ have slant linear camming slots cut through the walls thereof to control the movements of the first and second movable lens groups $G_M$ and $G_F$ by drive pins $P_1$ and $P_2$ respectively.

Macro photography or tracking adjustment is carried out by rotating the rotatable sleeves $W_M$ or $W_F$ respectively.

A numerical example 1 to be described later of the embodiment of the invention operates in such a manner that when in macro photography at an object distance of 10 mm from the front vertex of the zoom lens, the first movable lens group $G_M$ moves $-3.50$ mm in the wide-angle end, while when in the setting for tracking adjustment, for a $-1.0$ mm movement of the second movable lens group $G_F$, the shift of an image plane amounts to $-0.57$ mm.

Another numerical example 2 operates in such a manner that as the object distance decreases to 10 mm from the front vertex of the zoom lens, the first movable lens group $G_M$ moves $-4.58$ mm in the wide-angle end, and, when in the setting for tracking adjustment, a $-1.0$ mm movement of the second movable lens group $G_F$ results in the shift of the image plane to $-0.67$ mm.

The numerical examples 1 and 2 of the invention are shown below. In the numerical examples 1 and 2, Ri denotes the radius of curvature of the i-th lens surface counting from front, Di the i-th axial lens thickness or air separation counting from front, and Ni and νi the refractive index and Abbe number of the glass of the i-th lens element counting from front respectively.

NUMERICAL EXAMPLE 1

| $F = 10.4$–$99.8$ | FNo = 1:1.7 | $2\omega = 55.7°$ | Zoom ratio = 9.6 |
|---|---|---|---|
| R1 = −696.661 | D1 = 5.29 | N1 = 1.81265 | ν1 = 25.4 |
| R2 = 172.951 | D2 = 15.58 | N2 = 1.60548 | ν2 = 60.7 |
| R3 = −193.102 | D3 = 0.23 | | |
| R4 = 154.848 | D4 = 8.76 | N3 = 1.60548 | ν3 = 60.7 |
| R5 = ∞ | D5 = 0.23 | | |
| R6 = 66.583 | D6 = 9.89 | N4 = 1.60548 | ν4 = 60.7 |
| R7 = 141.636 | D7 = Variable | | |
| R8 = 87.651 | D8 = 2.02 | N5 = 1.71615 | ν5 = 53.8 |
| R9 = 22.618 | D9 = 8.99 | | |
| R10 = −34.228 | D10 = 2.02 | N6 = 1.71615 | ν6 = 53.8 |
| R11 = 25.905 | D11 = 7.01 | N7 = 1.81265 | ν7 = 25.4 |
| R12 = 283.385 | D12 = Variable | | |
| R13 = −33.968 | D13 = 1.55 | N8 = 1.76651 | ν8 = 40.1 |
| R14 = 43.779 | D14 = 3.83 | N9 = 1.81265 | ν9 = 25.4 |
| R15 = ∞ | D15 = Variable | | |
| R16 = Stop | D16 = 2.00 | | |
| R17 = −178.924 | D17 = 4.38 | N10 = 1.64419 | ν10 = 34.5 |
| R18 = −39.192 | D18 = 0.16 | | |
| R19 = 185.209 | D19 = 10.24 | N11 = 1.57124 | ν11 = 56.3 |
| R20 = −16.159 | D20 = 1.50 | N12 = 1.62984 | ν12 = 39.2 |
| R21 = −64.575 | *D21 = Variable | 37.00 | |
| R22 = −205.182 | D22 = 6.21 | N13 = 1.51313 | ν13 = 60.5 |
| R23 = −31.105 | D23 = 0.20 | | |
| R24 = −46.083 | D24 = 1.50 | N14 = 1.83932 | ν14 = 37.2 |
| R25 = 42.521 | D25 = 8.57 | N15 = 1.48915 | ν15 = 70.2 |
| R26 = −37.693 | D26 = 0.20 | | |
| R27 = 58.676 | D27 = 7.61 | N16 = 1.51313 | ν16 = 60.5 |
| R28 = −39.860 | D28 = 1.50 | N17 = 1.83932 | ν17 = 37.2 |
| R29 = −68.508 | *D29 = Variable | 1.5 | |
| R30 = 27.201 | D30 = 4.49 | N18 = 1.52032 | ν18 = 59.0 |
| R31 = 40.006 | *D31 = Variable | 5.00 | |
| R32 = ∞ | D32 = 50.00 | N19 = 1.51825 | ν19 = 64.1 |
| R33 = ∞ | | | |

D21: Variable When in Macro Photography
D31: Variable When in Tracking Adjustment
D29: Variable When in Either of Macro Photography and Tracking Adjustment

| Group | G1 | | | G2 | | G3 |
|---|---|---|---|---|---|---|
| Member | L1 | L2 | L3 | L4 | L5 | L6 |
| Surface | R1-R3 | R4-R5 | R6-R7 | R8-R9 | R10-R12 | R13-R15 |

| | G4 | | | | | |
|---|---|---|---|---|---|---|
| | | | | G42 | | |
| Group | | G41 | | GM | | GF |
| Member | L7 | L8 | L9 | L10 | L11 | L12 |
| Surface | R17-R18 | R19-R21 | R22-R23 | R24-R26 | R27-R29 | R30-R31 |

| | Focal length | |
|---|---|---|
| Variable separation | 10.4 | 99.8 |
| D7 | 1.49 | 58.21 |
| D12 | 62.69 | 6.69 |

-continued

| | D15 | 2.15 | 1.43 |
|---|---|---|---|

$$\frac{f_M}{f_R} = 1.49$$

NUMERICAL EXAMPLE 2

| F = 10.4 | FNo = 1:1.7 | 2ω = 55.7° | |
|---|---|---|---|
| R1 = −696.661 | D1 = 5.29 | N1 = 1.81265 | ν1 = 25.4 |
| R2 = 172.951 | D2 = 15.58 | N2 = 1.60548 | ν2 = 60.7 |
| R3 = −193.102 | D3 = 0.23 | | |
| R4 = 154.848 | D4 = 8.76 | N3 = 1.60548 | ν3 = 60.7 |
| R5 = ∞ | D5 = 0.23 | | |
| R6 = 66.583 | D6 = 9.89 | N4 = 1.60548 | ν4 = 60.7 |
| R7 = 141.636 | D7 = Variable | | |
| R8 = 87.651 | D8 = 2.02 | N5 = 1.71615 | ν5 = 53.8 |
| R9 = 22.618 | D9 = 8.99 | | |
| R10 = −34.228 | D10 = 2.02 | N6 = 1.71615 | ν6 = 53.8 |
| R11 = 25.905 | D11 = 7.01 | N7 = 1.81265 | ν7 = 25.4 |
| R12 = 283.385 | D12 = Variable | | |
| R13 = −33.968 | D13 = 1.55 | N8 = 1.76651 | ν8 = 40.1 |
| R14 = 43.779 | D14 = 3.83 | N9 = 1.81265 | ν9 = 25.4 |
| R15 = ∞ | D15 = Variable | | |
| R16 = Stop | D16 = 2.00 | | |
| R17 = −148.664 | D17 = 6.02 | N10 = 1.64419 | ν10 = 34.5 |
| R18 = −39.316 | D18 = 0.16 | | |
| R19 = 156.066 | D19 = 10.92 | N11 = 1.57124 | ν11 = 56.3 |
| R20 = −16.303 | D20 = 1.50 | N12 = 1.62984 | ν12 = 39.2 |
| R21 = −60.198 | *D21 = Variable | 37.00 | |
| R22 = −240.342 | D22 = 6.11 | N13 = 1.51313 | ν13 = 60.5 |
| R23 = −30.219 | D23 = 0.20 | | |
| R24 = −43.887 | D24 = 1.50 | N14 = 1.83932 | ν14 = 37.2 |
| R25 = 38.563 | D25 = 10.03 | N15 = 1.48915 | ν15 = 70.2 |
| R26 = −36.061 | D26 = 0.20 | | |
| R27 = 84.656 | D27 = 6.18 | N16 = 1.51313 | ν16 = 60.5 |
| R28 = −41.538 | D28 = 1.50 | N17 = 1.83932 | ν17 = 37.2 |
| R29 = −69.838 | *D29 = Variable | 1.5 | |
| R30 = 26.449 | D30 = 4.75 | N18 = 1.52032 | ν18 = 59.0 |
| R31 = 44.822 | *D31 = Variable | 5.00 | |
| R32 = ∞ | D32 = 50.00 | N19 = 1.51825 | ν19 = 64.1 |
| R33 = ∞ | | | |

D21: Variable When in Macro Photography
D31: Variable When in Tracking Adjustment
D29: Variable When in Either of Macro Photography and Tracking Adjustment

| Group | G1 | G2 | G3 |
|---|---|---|---|
| Member | L1 L2 L3 | L4 L5 | L6 |
| Surface | R1-R3 R4-R5 R6-R7 | R8-R9 R10-R12 | R13-R15 |

| | G4 | | | |
|---|---|---|---|---|
| | | | G42 | |
| Group | G41 | | GM | GF |
| Member | L7 | L8 L9 | L10 L11 | L12 |
| Surface | R17-R18 | R19-R21 R22-R23 | R24-R26 R27-R29 | R30-R31 |

| | Focal length | |
|---|---|---|
| Variable separation | 10.4 | 99.8 |
| D7 | 1.49 | 58.21 |
| D12 | 62.69 | 6.69 |
| D15 | 2.15 | 1.43 |

$$\frac{f_M}{f_R} = 1.77$$

Though, in the foregoing embodiment, the relay rear lens group G42 has been constructed from only the first movable lens group and the second movable lens group, another fixed lens member may be put into the relay rear lens group in order to make smaller the range of variation of aberrations with macro focusing or tracking. In this connection, another embodiment is described below.

FIGS. 6, 8, 10 and 12 in block diagram show numerical examples 3, 4, 5 and 6 of zoom lenses in the second embodiment of the invention. Incidentally, G1, G2, G3, G4 and P fulfill similar functions to those described above, and their explanation is omitted here.

The relay rear lens group G42 which is relevant to the invention is constructed in such a form that while a first movable lens group $G_M$ having a positive refractive power and axially movable for macro focusing and a second movable lens group $G_F$ having a positive refractive power and axially movable for tracking are arranged in this order from the front, an additional lens group $G_N$ having a negative refractive power and stationary during macro focusing, and tracking is arranged in between the first movable lens group $G_M$ and the second movable lens group $G_F$. This fixed negative lens group $G_N$ is used for suppressing the variations of aberrations in good balance when macro photography and tracking adjustment are carried out by the respective movable lens groups independently of each other.

Now, another features of the invention are conditions for stabilizing good correction of aberrations particularly in the ranges of movement of the first and second movable lens groups $G_M$ and $G_F$ when the size of the rear lens group of the relay lens group is minimized.

That is, letting the focal lengths of the aforesaid rear lens group of the relay lens group, the aforesaid first movable lens group and the aforesaid second movable lens group be denoted by $f_R$, $f_M$ and $f_F$ respectively and the distance from the rear principal plane of the aforesaid second movable lens group to the image plane by B, the following conditions are satisfied:

$$0.9 < f_M/f_R < 1.9 \tag{2}$$

$$0.8 < f_F/B < 1.8 \tag{3}$$

The above-described inequalities of condition (2) concern with the relationship between the focal length $f_M$ of the first movable lens group $G_M$ which moves when in macro photography and the focal length $f_R$ of the rear lens group G42 of the relay lens group, and has an aim to set up so proper a refractive power in the first movable lens group $G_M$ that, on one hand, macro focusing is made possible and on the other hand, while maintaining a minimization of the size of the relay rear lens group to be achieved, good optical performance is stabilized over the entire macro focusing range. When the lower limit is exceeded, it gets harder to suppress the variation of spherical aberration and coma with macro focusing, because the power of the first movable lens group $G_M$ is too strong. When the upper limit is exceeded, the total movement for the equivalent macro focusing range of the first movable lens group $G_M$ becomes too large, which in turn causes the size of the lens system to increase largely.

The inequalities of condition (3) concern with relationship between the focal length $f_F$ of the second movable lens group $G_F$ which moves when tracking and the distance B of the rear principal point of the second movable lens group $G_F$ to the image plane and has an aim to suppress the range of variation of aberrations for the desired amount of tracking adjustment. It is desirable on the aberration correction to get the entirety of a lens system that lies on the object side of the second movable lens group $G_F$ approaching the afocal form.

When the lower limit is exceeded, the lens system on the object side of the second movable lens group $G_F$ becomes a relatively strong divergent system. When the upper limit is exceeded, it becomes a converse or relatively strong convergent system. In either case, spherical aberration, coma and curvature of field are caused to vary to large extent. So, it gets harder to maintain good imaging performance stable against tracking adjustment.

For the particular case where the relay rear lens group $G_{42}$ is constructed in the form of three lens groups, i.e., from front to rear, the first movable lens group $G_M$ for macro focusing, the fixed lens group $G_N$ of negative power which remains stationary during macro focusing and tracking, and the second movable lens group $G_F$ for tracking adjustment, it is recommended that the focal length $f_N$ of the fixed lens group $G_N$ lies within the following range:

$$-2.9 < f_N/f_R < -0.9 \qquad (4)$$

The inequalities of condition (4) are set forth particularly for the relay rear lens group of the 3-component type comprising, from front to rear, the first movable lens group of positive power, the fixed lens group of negative power and the second movable lens group of positive power, and concern with the relationship between the focal length $f_N$ of the fixed lens group of negative power and the focal length $f_R$ of the relay rear lens group. When the lower limit is exceeded, the negative power becomes too weak to sufficiently differentiate the angles of entrance and emergence of the light beam on and from the fixed lens group of negative power. When the upper limit is exceeded, the difference between the angles of entrance and emergence of the light beam on and from the lens group of negative power conversely becomes outstanding because the negative power is too strong. In either case, the balance of aberrations, particularly spherical aberration and astigmatism, between when in macro photography and when tracking is broken. So, it gets harder to effect good results in the performance of both functions.

And, in connection with the 3-component form of the relay rear lens group, the invention has further features that the first movable lens group is constructed with two convex singlet lenses and one cemented lens, the fixed lens group of negative power is constructed with either one concave singlet lens whose rear surface is stronger in curvature than the front surface, or one doublet of a positive lens and a negative lens cemented together, and the second movable lens group is constructed with either one convex singlet lens, or one cemented lens.

Figure 10:
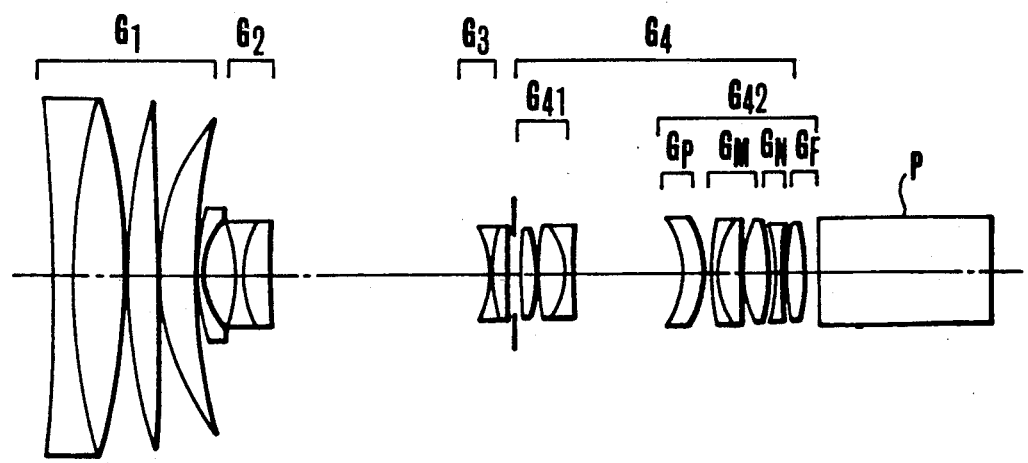
Figure 11A:
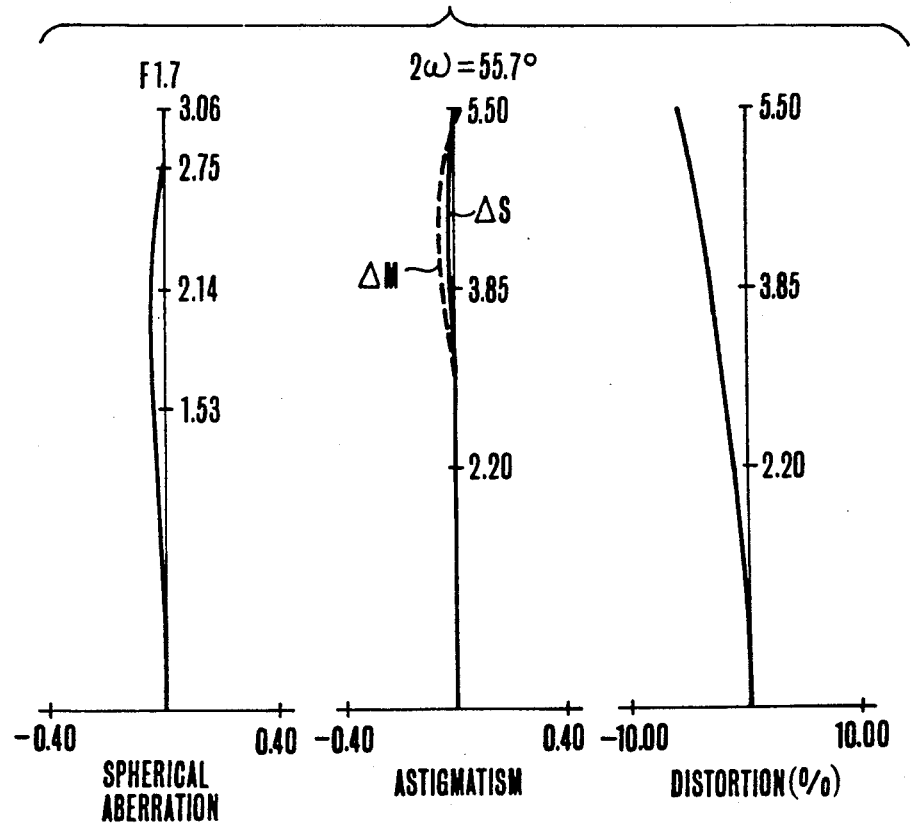
Figure 11B:
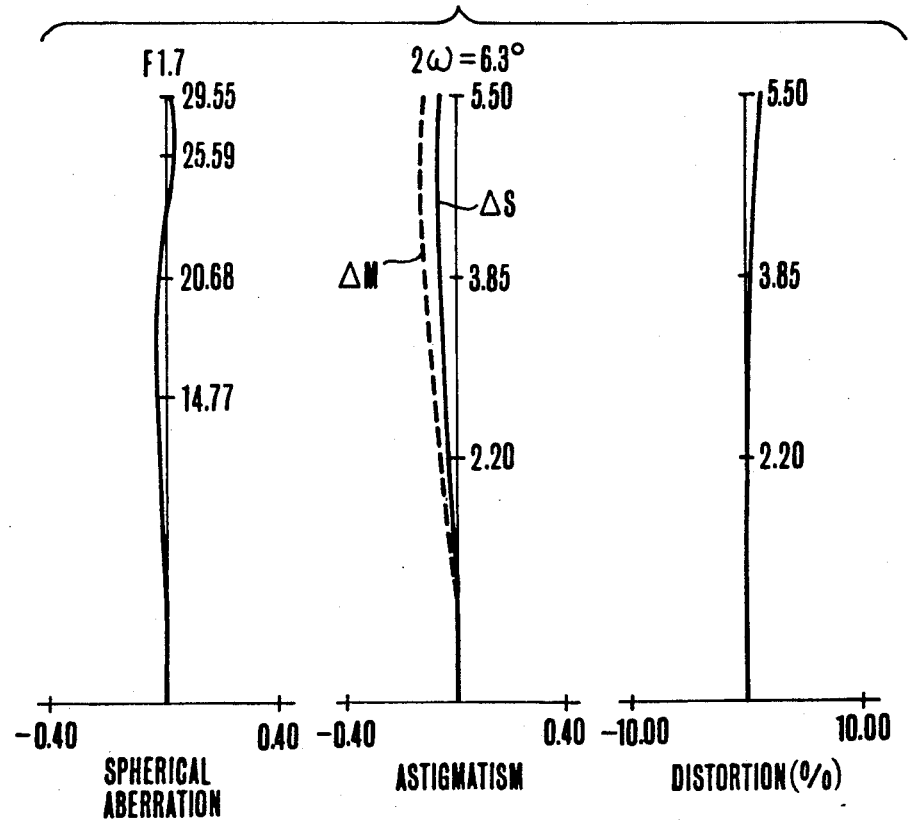
Figure 11C:
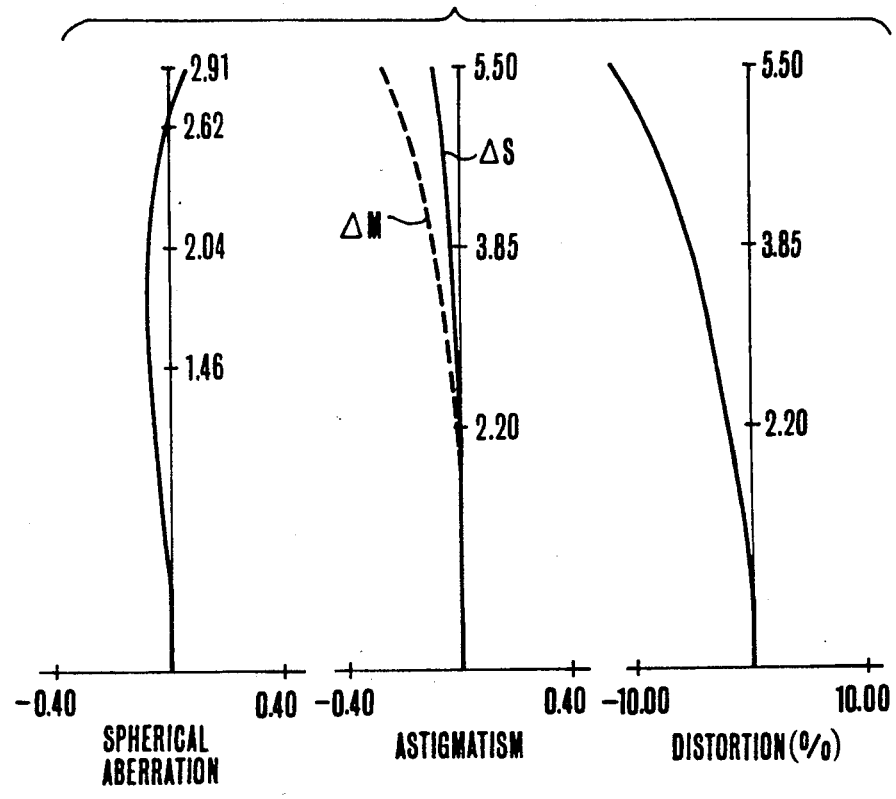
Figure 11D:
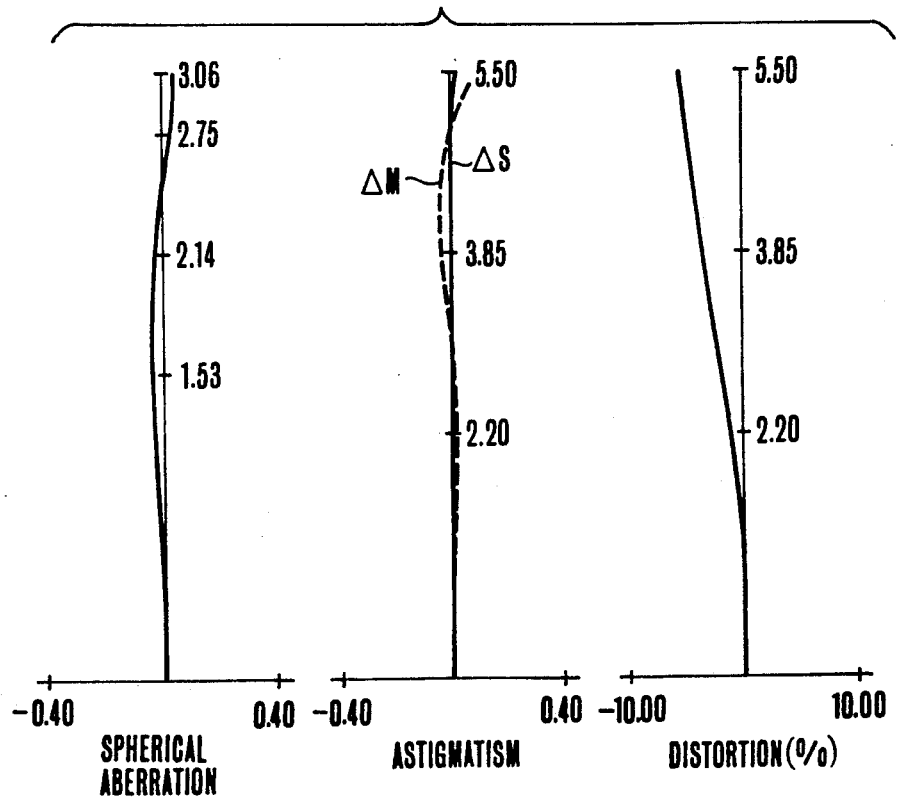
Figure 12:
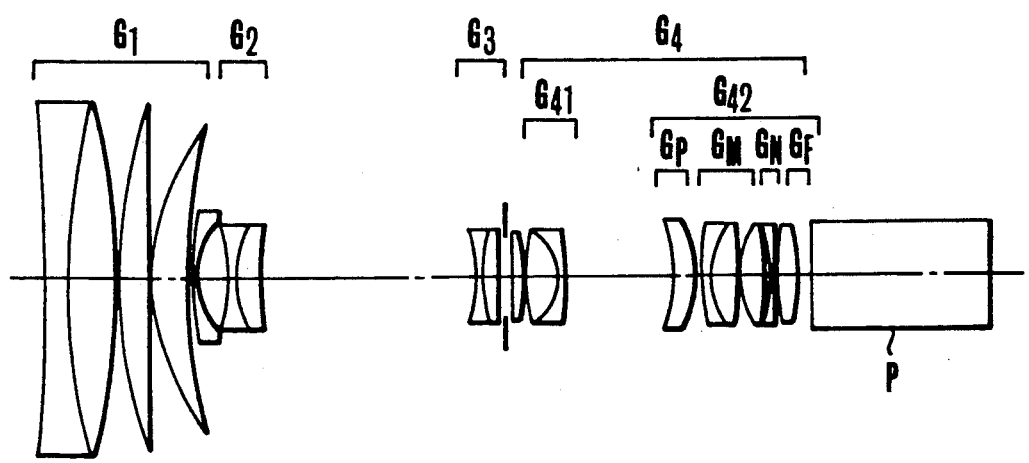
Figure 13A:
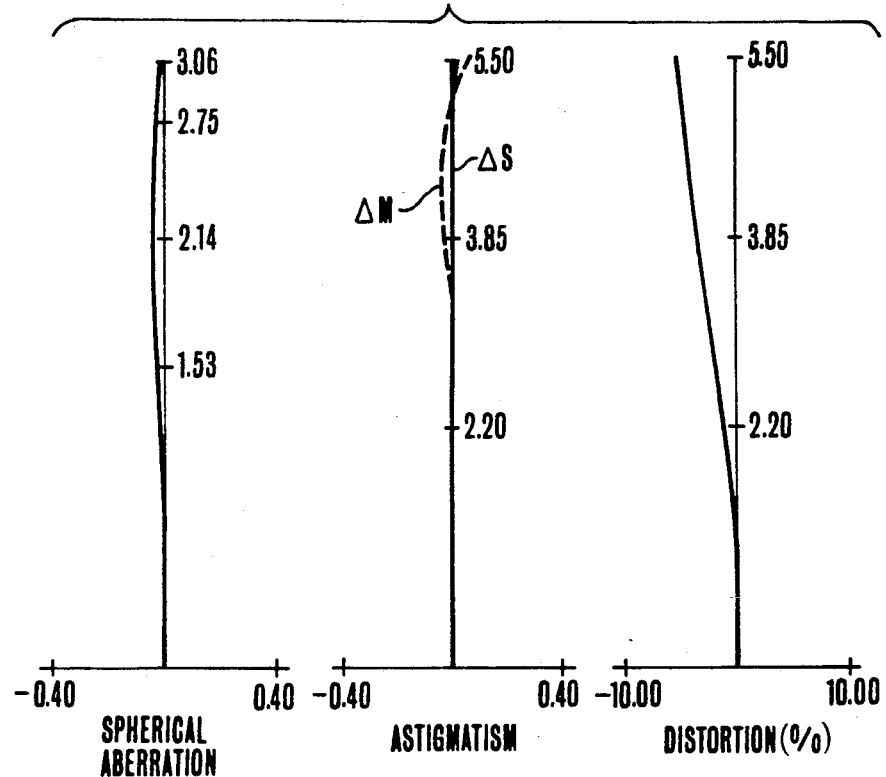
Figure 13B:
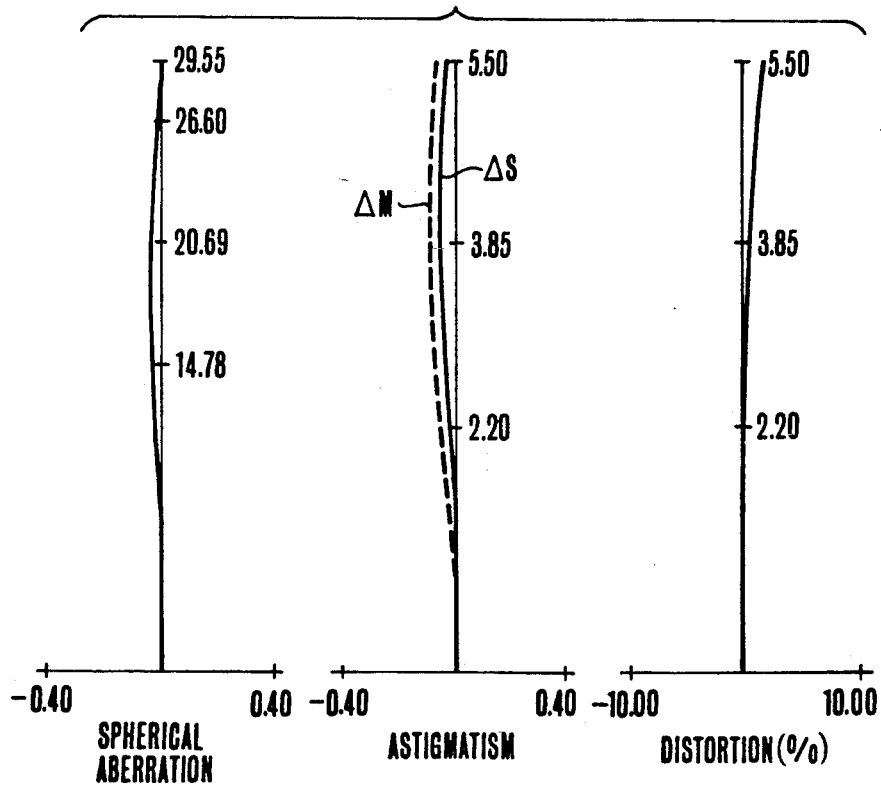
Figure 13C:
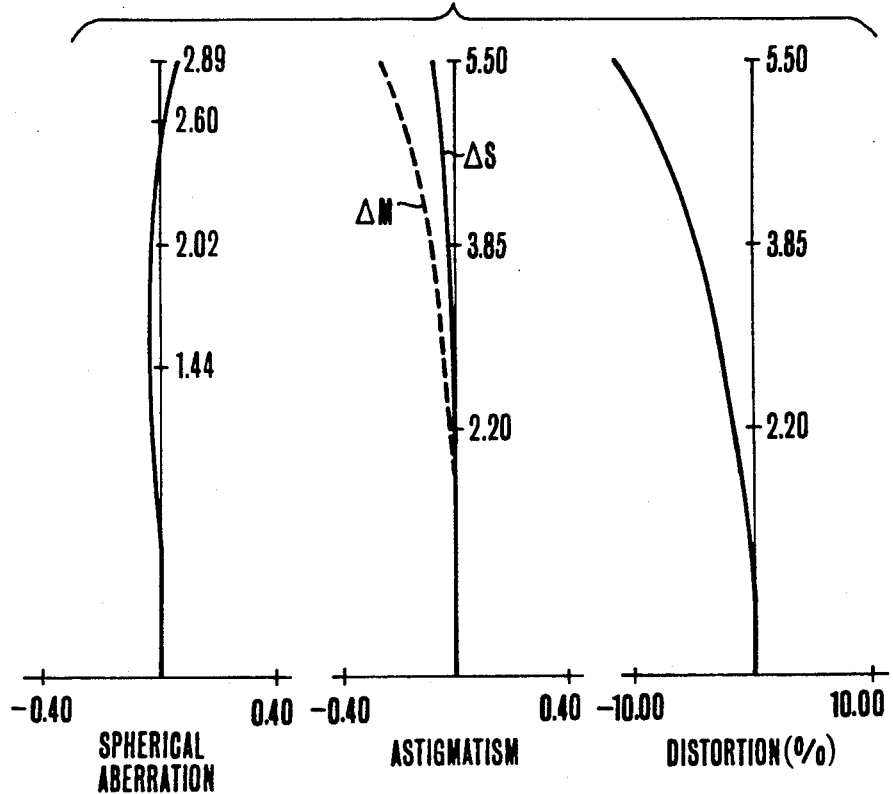
Figure 13D:
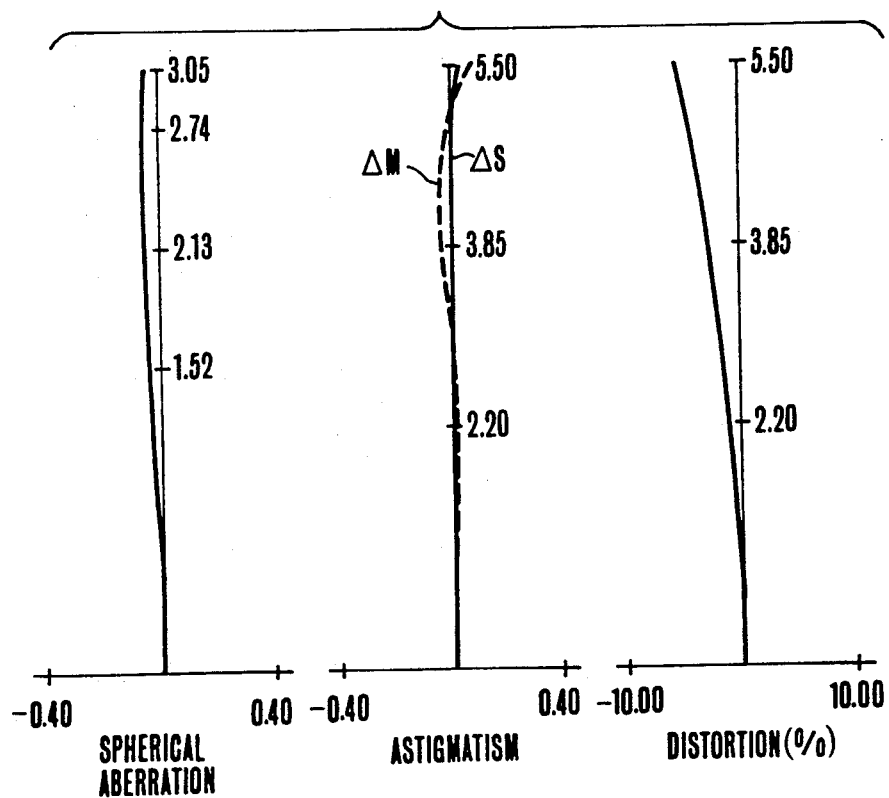

Meanwhile, particular emphasis may be laid on the stabilization of aberration against macro focusing. In this case, it is better that, as shown in FIG. 10 and FIG. 12, the relay rear lens group $G_{42}$ is constructed in another form of four lens groups, or, from front to rear, a first fixed lens group $G_P$ of positive power, a first movable lens group $G_M$ for macro focusing, a second fixed lens group $G_N$ of negative power, and a second movable lens group $G_F$ for tracking adjustment. With this, particularly for that fixed lens group which has the negative power, it is recommended that its focal length $f_N$ lies within the following range:

$$-2.2 < f_N/f_R < 0.7 \qquad (4)'$$

The positive fixed lens group $G_P$ is introduced, on one hand, to take burden of some of the power which would otherwise be put all on the first movable lens group for macro and, on the other hand, to produce an advantage of suppressing the variation of aberrations with macro focusing. On account of this, the inequalities of condition (4)' represent a desired refractive power arrangement on the negative fixed lens group $G_N$. When the upper limit is exceeded, the negative refractive power becomes too strong. When the lower limit is exceeded, the negative refractive power becomes too weak. In either case, it gets harder to take good balance between the variations of aberrations, particularly, spherical aberration and curvature of field with movements of the first and second movable lens groups.

With the use of the 4-component form in the relay rear lens group, it is desirable that the first fixed lens group $G_P$ of positive power is constructed with either one convex singlet lens, or one cemented lens, that the first movable lens group $G_M$ is constructed with one convex singlet lens and either one cemented lens, or two cemented lenses, and that the second fixed lens group $G_N$ of negative power is constructed with one concave singlet lens, and the second movable lens group $G_F$ is constructed from either one convex singlet lens, or one cemented lens. Also, the spacing between the first fixed lens group of positive power and the first movable lens group is so determined as not to create a dead space from the relation of the set value of the closest object distance with the set value of the power of the first movable lens group.

Examples of specific zoom lenses of this embodiment of the invention can be constructed in accordance with the numerical data to be described later. At first, in the numerical example 3, when in macro photography, the first movable lens group $G_M$ moves $-2.08$ mm in the wide-angle end to effect focusing to an object distance of 10 mm from the front vertex of the zoom lens. When in tracking adjustment, for $-0.5$ mm movement of the second movable lens $G_F$, the shifted amount of the image plane is $-0.48$ mm.

In the numerical example 4, the first movable lens group $G_M$ moves $-3.88$ mm in the wide-angle end to effect focusing to the object distance of 10 mm from the front vertex. When in tracking adjustment, for $-0.5$ mm movement of the second movable lens group $G_F$, the shifted amount of the image plane is $-0.47$ mm.

In the numerical example 5, the first movable lens group $G_M$ moves $-1.18$ mm in the wide-angle end to effect focusing to the object distance of 10 mm from the front vertex. When in tracking adjustment, for $-0.5$ mm movement of the second movable lens group $G_F$, the shifted amount of the image plane is $-0.5$ mm.

In the numerical example 6, the first movable lens group $G_M$ moves $-1.93$ mm in the wide-angle end to effect focusing to the object distance of 10 mm from the front vertex. When in tracking adjustment, for $-0.5$ mm movement of the second movable lens group $G_F$, the shifted amount of the image plane is $-0.42$ mm.

The numerical data for these examples 3 to 6 are shown below. In the numerical examples 3 to 6, Ri is the radius of curvature of the i-th lens surface counting from front, Di the i-th axial lens thickness or air separation counting from front, and Ni and $\nu i$ the refractive index and Abbe number of the glass of the i-th lens element counting from front respectively.

NUMERICAL EXAMPLE 3

| F = 10.4 | FNo = 1:1.7 | 2ω = 55.7° | Zoom ratio = 9.6 |
|---|---|---|---|
| R1 = −696.661 | D1 = 5.29 | N1 = 1.81265 | ν1 = 25.4 |
| R2 = 172.951 | D2 = 15.58 | N2 = 1.60548 | ν2 = 60.7 |
| R3 = −193.102 | D3 = 0.23 | | |
| R4 = 154.848 | D4 = 8.76 | N3 = 1.60548 | ν3 = 60.7 |
| R5 = ∞ | D5 = 0.23 | | |
| R6 = 66.583 | D6 = 9.89 | N4 = 1.60548 | ν4 = 60.7 |
| R7 = 141.636 | D7 = Variable | | |
| R8 = 87.651 | D8 = 2.02 | N5 = 1.71615 | ν5 = 53.8 |
| R9 = 22.618 | D9 = 8.99 | | |
| R10 = −34.228 | D10 = 2.02 | N6 = 1.71615 | ν6 = 53.8 |
| R11 = 25.905 | D11 = 7.01 | N7 = 1.81265 | ν7 = 25.4 |
| R12 = 283.385 | D12 = Variable | | |
| R13 = −33.968 | D13 = 1.55 | N8 = 1.76651 | ν8 = 40.1 |
| R14 = 43.779 | D14 = 3.83 | N9 = 1.81265 | ν9 = 25.4 |
| R15 = ∞ | D15 = Variable | | |
| R16 = Stop | D16 = 2.00 | | |
| R17 = −203.987 | D17 = 4.74 | N10 = 1.64419 | ν10 = 34.5 |
| R18 = −35.909 | D18 = 0.16 | | |
| R19 = 104.123 | D19 = 8.71 | N11 = 1.57124 | ν11 = 56.3 |
| R20 = −17.794 | D20 = 1.50 | N12 = 1.62984 | ν12 = 39.2 |
| R21 = −124.948 | *D21 = Variable | 38.00 | |
| R22 = −48.696 | D22 = 5.11 | N13 = 1.63004 | ν13 = 35.7 |
| R23 = −26.810 | D23 = 0.15 | | |
| R24 = −43.311 | D24 = 1.50 | N14 = 1.83932 | ν14 = 37.2 |
| R25 = 27.644 | D25 = 9.54 | N15 = 1.50014 | ν15 = 65.0 |
| R26 = −37.619 | D26 = 0.15 | | |
| R27 = 35.596 | D27 = 7.05 | N16 = 1.60718 | ν16 = 38.0 |
| R28 = −128.115 | *D28 = Variable | 0.15 | |
| R29 = 49.259 | D29 = 4.83 | N17 = 1.53440 | ν17 = 48.9 |
| R30 = −677.709 | D30 = 1.50 | N18 = 1.83932 | ν18 = 37.2 |
| R31 = 24.553 | *D31 = Variable | 2.00 | |
| R32 = 24.835 | D32 = 6.16 | N19 = 1.6226 | ν19 = 60.3 |
| R33 = −938.344 | *D33 = Variable | 5.00 | |
| R34 = ∞ | D34 = 50.00 | N20 = 1.51825 | ν20 = 64.1 |
| R35 = ∞ | | | |

D21 & D28: Variable for Macro Photograph
D31 & D33: Variable for Tracking Adjustment

| Group | G1 | | | G2 | | G3 |
|---|---|---|---|---|---|---|
| Member | L1 | L2 | L3 | L4 | L5 | L6 |
| Surface | R1-R3 | R4-R5 | R6-R7 | R8-R9 | R10-R12 | R13-R15 |

| Group | G4 | | | | | | |
|---|---|---|---|---|---|---|---|
| | G41 | G42 | | | | | |
| | | GM | | GN | | GF | |
| Member | L7 | L8 | L9 | L10 | L11 | L12 | L13 |
| Surface | R17-R18 | R19-R21 | R22-R23 | R24-R26 | R27-R28 | R29-R31 | R32-R33 |

| | Focal length | |
|---|---|---|
| Variable separation | 10.4 | 99.8 |
| D7 | 1.49 | 58.21 |
| D12 | 62.69 | 6.69 |
| D15 | 2.15 | 1.43 |

$$\frac{f_M}{f_R} = 1.17$$

$$\frac{f_F}{B} = 0.85$$

$$\frac{f_N}{f_R} = -1.04$$

NUMERICAL EXAMPLE 4

| F = 10.4 | FNo = 1:1.7 | 2ω = 55.7° | |
|---|---|---|---|
| R1 = −696.661 | D1 = 5.29 | N1 = 1.81265 | ν1 = 25.4 |
| R2 = 172.951 | D2 = 15.58 | N2 = 1.60548 | ν2 = 60.7 |
| R3 = −193.102 | D3 = 0.23 | | |
| R4 = 154.848 | D4 = 8.76 | N3 = 1.60548 | ν3 = 60.7 |
| R5 = ∞ | D5 = 0.23 | | |
| R6 = 66.583 | D6 = 9.89 | N4 = 1.60548 | ν4 = 60.7 |
| R7 = 141.636 | D7 = Variable | | |
| R8 = 87.651 | D8 = 2.02 | N5 = 1.71615 | ν5 = 53.8 |
| R9 = 22.618 | D9 = 8.99 | | |
| R10 = −34.228 | D10 = 2.02 | N6 = 1.71615 | ν6 = 53.8 |
| R11 = 25.905 | D11 = 7.01 | N7 = 1.81265 | ν7 = 25.4 |
| R12 = 283.385 | D12 = Variable | | |
| R13 = −33.968 | D13 = 1.55 | N8 = 1.76651 | ν8 = 40.1 |
| R14 = 43.779 | D14 = 3.83 | N9 = 1.81265 | ν9 = 25.4 |
| R15 = ∞ | D15 = Variable | | |
| R16 = Stop | D16 = 2.00 | | |
| R17 = −85.222 | D17 = 4.22 | N10 = 1.64419 | ν10 = 34.5 |
| R18 = −37.866 | D18 = 0.16 | | |
| R19 = 249.326 | D19 = 10.92 | N11 = 1.56181 | ν11 = 61.2 |
| R20 = −14.272 | D20 = 1.50 | N12 = 1.63004 | ν12 = 35.7 |
| R21 = −38.531 | *D21 = Variable | 38.00 | |
| R22 = −53.460 | D22 = 5.35 | N13 = 1.63004 | ν13 = 35.7 |
| R23 = −26.056 | D23 = 0.15 | | |
| R24 = −43.066 | D24 = 1.50 | N14 = 1.83932 | ν14 = 37.2 |
| R25 = 27.668 | D25 = 10.39 | N15 = 1.50014 | ν15 = 65.0 |
| R26 = −47.391 | D26 = 0.15 | | |
| R27 = 44.565 | D27 = 6.44 | N16 = 1.60718 | ν16 = 38.0 |
| R28 = −154.231 | *D28 = Variable | 0.15 | |
| R29 = 94.145 | D29 = 2.00 | N17 = 1.83932 | ν17 = 37.2 |
| R30 = 49.448 | *D30 = Variable | 2.00 | |
| R31 = 41.143 | D31 = 5.61 | N18 = 1.62286 | ν18 = 60.3 |
| R32 = −670.649 | *D32 = Variable | 5.00 | |
| R33 = ∞ | D33 = 50.00 | N19 = 1.51825 | ν19 = 64.1 |
| R34 = ∞ | | | |

D21 & D28: Variable for Macro Photography
D30 & D33: Variable for Tracking Adjustment

| Group | G1 | | | G2 | | G3 |
|---|---|---|---|---|---|---|
| Member | L1 | L2 | L3 | L4 | L5 | L6 |
| Surface | R1-R3 | R4-R5 | R6-R7 | R8-R9 | R10-R12 | R13-R15 |

| Group | G4 | | | | | | |
|---|---|---|---|---|---|---|---|
| | G41 | G42 | | | | | |
| | | GM | | GN | | GF | |
| Member | L7 | L8 | L9 | L10 | L11 | L12 | L13 |
| Surface | R17-R18 | R19-R21 | R22-R23 | R24-R26 | R27-R28 | R29-R31 | R32-R33 |

| | Focal length | |
|---|---|---|
| Variable separation | 10.4 | 99.8 |
| D7 | 1.49 | 58.21 |
| D12 | 62.69 | 6.69 |
| D15 | 2.15 | 1.43 |

$$\frac{f_M}{f_R} = 1.67$$

$$\frac{f_F}{B} = 1.33$$

$$\frac{f_N}{f_R} = -2.83$$

NUMERICAL EXAMPLE 5

| F = 10.4 | FNo = 1:1.7 | 2ω = 55.7° | |
|---|---|---|---|
| R1 = −696.661 | D1 = 5.29 | N1 = 1.81265 | ν1 = 25.4 |
| R2 = 172.951 | D2 = 15.58 | N2 = 1.60548 | ν2 = 60.7 |
| R3 = −193.102 | D3 = 0.23 | | |
| R4 = 154.848 | D4 = 8.76 | N3 = 1.60548 | ν3 = 60.7 |
| R5 = ∞ | D5 = 0.23 | | |
| R6 = 66.583 | D6 = 9.89 | N4 = 1.60548 | ν4 = 60.7 |
| R7 = 141.636 | D7 = Variable | | |
| R8 = 87.651 | D8 = 2.02 | N5 = 1.71615 | ν5 = 53.8 |
| R9 = 22.618 | D9 = 8.99 | | |
| R10 = −34.228 | D10 = 2.02 | N6 = 1.71615 | ν6 = 53.8 |

-continued

| | | | |
|---|---|---|---|
| R11 = 25.905 | D11 = 7.01 | N7 = 1.81265 | ν7 = 25.4 |
| R12 = 283.385 | D12 = Variable | | |
| R13 = −33.968 | D13 = 1.55 | N8 = 1.76651 | ν8 = 40.1 |
| R14 = 43.779 | D14 = 3.83 | N9 = 1.81265 | ν9 = 25.4 |
| R15 = ∞ | D15 = Variable | | |
| R16 = Stop | D16 = 2.00 | | |
| R17 = 1095.587 | D17 = 4.14 | N10 = 1.62409 | ν10 = 36.3 |
| R18 = −45.562 | D18 = 0.16 | | |
| R19 = 57.118 | D19 = 9.07 | N11 = 1.57124 | ν11 = 56.3 |
| R20 = −18.261 | D20 = 1.50 | N12 = 1.62984 | ν12 = 39.2 |
| R21 = −950.633 | D21 = 32.00 | | |
| R22 = −30.364 | D22 = 6.44 | N13 = 1.55099 1.70 | ν13 = 45.8 |
| R23 = −25.312 | *D23 = Variable | | |
| R24 = 84.358 | D24 = 1.20 | N14 = 1.83932 | ν14 = 37.2 |
| R25 = 20.036 | D25 = 7.89 | N15 = 1.48915 | ν15 = 70.2 |
| R26 = −355.728 | D26 = 0.20 | | |
| R27 = 29.939 | D27 = 7.49 | N16 = 1.52032 2.00 | ν16 = 59.0 |
| R28 = −55.065 | *D28 = Variable | | |
| R29 = −42.319 | D29 = 1.50 | N17 = 1.83932 1.00 | ν17 = 37.2 |
| R30 = 110.866 | *D30 = Variable | | |
| R31 = 50.584 | D31 = 5.81 | N18 = 1.62409 4.00 | ν18 = 36.3 |
| R32 = −48.661 | *D32 = Variable | | |
| R33 = ∞ | D33 = 50.00 | N19 = 1.51825 | ν19 = 64.1 |
| R34 = ∞ | | | |

D23 & D28: Variable for Macro Photography
D30 & D33: Variable for Tracking Adjustment

| Group | G1 | G2 | G3 | | | |
|---|---|---|---|---|---|---|
| Member | L1 | L2 | L3 | L4 | L5 | L6 |
| Surface | R1-R3 | R4-R5 | R6-R7 | R8-R9 | R10-R12 | R13-R15 |

| | G4 | | | | | |
|---|---|---|---|---|---|---|
| Group | G41 | G42 | | | | |
| | | GM | | GN | GF | |
| Member | L7 | L8 | L9 | L10 | L11 | L12 | L13 |
| Surface | R17-R18 | R19-R21 | R22-R23 | R24-R26 | R27-R28 | R29-R31 | R32-R33 |

| | Focal length | |
|---|---|---|
| Variable separation | 10.4 | 99.8 |
| D7 | 1.49 | 58.21 |
| D12 | 62.69 | 6.69 |
| D15 | 2.15 | 1.43 |

$$\frac{f_M}{f_R} = 1.13$$

$$\frac{f_F}{B} = 0.95$$

$$\frac{f_N}{f_R} = -0.87$$

NUMERICAL EXAMPLE 6

| F = 10.4 | FNo = 1:1.7 | 2ω = 55.7° | |
|---|---|---|---|
| R1 = −696.661 | D1 = 5.29 | N1 = 1.81265 | ν1 = 25.4 |
| R2 = 172.951 | D2 = 15.58 | N2 = 1.60548 | ν2 = 60.7 |
| R3 = −193.102 | D3 = 0.23 | | |
| R4 = 154.848 | D4 = 8.76 | N3 = 1.60548 | ν3 = 60.7 |
| R5 = ∞ | D5 = 0.23 | | |
| R6 = 66.583 | D6 = 9.89 | N4 = 1.60548 | ν4 = 60.7 |
| R7 = 141.636 | D7 = Variable | | |
| R8 = 87.651 | D8 = 2.02 | N5 = 1.71615 | ν5 = 53.8 |
| R9 = 22.618 | D9 = 8.99 | | |
| R10 = −34.228 | D10 = 2.02 | N6 = 1.71615 | ν6 = 53.8 |
| R11 = 25.905 | D11 = 7.01 | N7 = 1.81265 | ν7 = 25.4 |
| R12 = 283.385 | D12 = Variable | | |
| R13 = −33.968 | D13 = 1.55 | N8 = 1.76651 | ν8 = 40.1 |
| R14 = 43.779 | D14 = 3.83 | N9 = 1.81265 | ν9 = 25.4 |
| R15 = ∞ | D15 = Variable | | |
| R16 = Stop | D16 = 2.00 | | |

-continued

| | | | |
|---|---|---|---|
| R17 = −383.131 | D17 = 4.22 | N10 = 1.62409 | ν10 = 36.3 |
| R18 = −40.366 | D18 = 0.16 | | |
| R19 = 89.630 | D19 = 9.09 | N11 = 1.57124 | ν11 = 56.3 |
| R20 = −16.056 | D20 = 1.50 | N12 = 1.62984 | ν12 = 39.2 |
| R21 = −147.599 | D21 = 32.00 | | |
| R22 = −52.092 | D22 = 7.16 | N13 = 1.55099 2.50 | ν13 = 45.8 |
| R23 = −28.861 | *D23 = Variable | | |
| R24 = 135.804 | D24 = 1.20 | N14 = 1.83932 | ν14 = 37.2 |
| R25 = 21.444 | D25 = 8.52 | N15 = 1.48915 | ν15 = 70.2 |
| R26 = −1065.097 | D26 = 0.20 | | |
| R27 = 28.320 | D27 = 6.77 | N16 = 1.52032 2.00 | ν16 = 59.0 |
| R28 = −141.964 | *D28 = Variable | | |
| R29 = −51.196 | D29 = 1.50 | N17 = 1.83932 1.00 | ν17 = 37.2 |
| R30 = −205.134 | *D30 = Variable | | |
| R31 = 104.667 | D31 = 4.93 | N18 = 1.62409 4.00 | ν18 = 36.3 |
| R32 = −71.975 | *D32 = Variable | | |
| R33 = ∞ | D33 = 50.00 | N19 = 1.51825 | ν19 = 64.1 |
| R34 = ∞ | | | |

D23 & D28: Variable for Macro Photography
D30 & D33: Variable for Tracking Adjustment

| Group | G1 | G2 | G3 | | | |
|---|---|---|---|---|---|---|
| Member | L1 | L2 | L3 | L4 | L5 | L6 |
| Surface | R1-R3 | R4-R5 | R6-R7 | R8-R9 | R10-R12 | R13-R15 |

| | G4 | | | | | |
|---|---|---|---|---|---|---|
| Group | G41 | G42 | | | | |
| | | GM | | GN | GF | |
| Member | L7 | L8 | L9 | L10 | L11 | L12 | L13 |
| Surface | R17-R18 | R19-R21 | R22-R23 | R24-R26 | R27-R28 | R29-R31 | R32-R33 |

| | Focal length | |
|---|---|---|
| Variable separation | 10.4 | 99.8 |
| D7 | 1.49 | 58.21 |
| D12 | 62.69 | 6.69 |
| D15 | 2.15 | 1.43 |

$$\frac{f_M}{f_R} = 1.72$$

$$\frac{f_F}{B} = 1.64$$

$$\frac{f_N}{f_R} = -1.90$$

As has been described above, according to the invention, despite the extension of the macro focusing range down to −10 mm, an improvement of the imaging performance is achieved, and, even when in tracking adjustment, it becomes possible to obtain good imaging performance.

We claim:
1. A zoom lens comprising:
   a lens group including a lens axially movable for focusing and lenses axially movable for zooming, and
   a relay lens group for fulfilling an image forming function, said relay lens group including a relay front lens group and a relay rear lens group with the intervening air spacing being the longest spacing between any two lenses in said relay lens group, and said relay rear lens group including a first movable lens group that is stationary for zooming and axially movable for macro photography and a second movable lens group that is stationary for zooming and axially movable for tracking adjustment.
2. A zoom lens according to claim 1, satisfying the following condition:

$$1.2 < f_M/f_R < 1.9$$

where $f_M$ and $f_R$ are focal lengths of said first movable lens group and said relay rear lens group respectively.

3. A zoom lens according to claim 1, wherein said relay rear lens group further includes a fixed negative lens in between said first movable lens group and said second movable lens group.

4. A zoom lens according to claim 3, satisfying the following conditions:

$$0.9 < f_M/f_R < 1.9$$

$$0.8 < f_F/B < 1.8$$

where $f_R$, $f_M$ and $f_F$ are focal lengths of said relay rear lens group of said relay lens group, said first movable lens group and said second movable lens group respectively, and B is a distance from the rear principal point of said second movable lens group to an image plane.

5. A zoom lens according to claim 4, satisfying the following condition:

$$-2.9 < f_N/f_R < -0.9$$

where $f_N$ is a focal length of said fixed negative lens.

6. A zoom lens comprising:
from front to rear,
a lens group including at least one lens that is axially movable for zooming; and
a relay lens group for fulfilling an image forming function, said relay lens group including a first movable lens group that is stationary for zooming and axially movable for macro photography and a second movable lens group axially movable for tracking adjustment, wherein said relay lens group includes a relay front lens group and a relay rear lens group with the intervening air spacing between the relay front lens group and the relay rear lens group being the longest spacing in said relay lens group, wherein further said relay rear lens group includes said first and said second movable lens groups, and the zoom lens satisfies the following condition:

$$1.2 < f_M/f_R < 1.9$$

where $f_M$ and $f_R$ are focal lengths of said first movable lens group and said relay rear lens group, respectively.

7. A zoom lens according to claim 6, wherein said relay rear lens group further includes a fixed negative lens in between said first movable lens group and said second movable lens group.

8. A zoom lens comprising:
from front to rear,
a lens group including at least lenses axially movable for zooming; and
a relay lens group for fulfilling an image forming function, said relay lens group including a first movable lens group that is stationary for zooming and axially movable for macro photography and a second movable lens group axially movable for tracking adjustment, wherein said relay lens group includes a relay front lens group and a relay rear lens group with the intervening air spacing between the relay front lens group and the relay rear lens group being the longest spacing between any two lenses in said relay lens group, wherein said relay rear lens group includes said first and said second movable lens groups and a fixed negative lens located between said first and second movable lens groups.

9. A zoom lens according to claim 8, satisfying the following conditions:

$$0.9 < f_M/f_R < 1.9$$

$$0.8 < f_F/B < 1.8$$

where $f_R$, $f_M$ and $f_F$ are focal lengths of said relay rear lens group of said relay lens group, said first movable lens group and said second movable lens group respectively, and B is a distance from the rear principal point of said second movable lens group to an image plane.

10. A zoom lens according to claim 9, satisfying the following condition:

$$-2.9 < f_N/f_R < -0.9$$

where $f_N$ is a focal length of said fixed negative lens.

* * * * *

UNITED STATES PATENT AND TRADEMARK OFFICE
CERTIFICATE OF CORRECTION

PATENT NO. : 5,191,475
DATED : March 2, 1993
INVENTOR(S) : TERASAWA ET AL.

It is certified that error appears in the above-indentified patent and that said Letters Patent is hereby corrected as shown below:

ON THE TITLE PAGE:

[75] INVENTORS::
under Terasawa: "Kanagawa" should read --Yokohama--; and
under Fukami: "Kanagawa" should read --Yokohama--.

COLUMN 3:
line 11, "with" should be deleted; and
line 47, "line $\lambda$" should read --line $\ell$--.

COLUMN 4:
line 13, insert: --As shown more particularly in the following variable separation vs. focal length Tables, the first and second movable lens groups of the relay unit remain stationary. The following Tables further show that the other spaces are meant to remain constant.--

COLUMN 6:
line 23, "another" should read --other--;
line 41, "with" should be deleted; and
line 59, "with" should be deleted.

COLUMN 7:
line 27, "with" should be deleted; and
line 43, "And," should read --Also,--.

COLUMN 9:
line 40, "Photograph" should read --Photography--.

UNITED STATES PATENT AND TRADEMARK OFFICE
CERTIFICATE OF CORRECTION

PATENT NO. : 5,191,475
DATED : March 2, 1993
INVENTOR(S) : TERASAWA ET AL.

It is certified that error appears in the above-indentified patent and that said Letters Patent is hereby corrected as shown below:

COLUMN 10:
    line 34, "D30 & D33" should read --D30 & D32--.

COLUMN 11:
    line 28, "D30 & D33" should read --D30 & D32--.

COLUMN 12:
    line 22, "D30 & D33" should read --D30 & D32--; and
    line 52, "zooming" should read --zooming;--.

COLUMN 14:
    line 16, "group axially" should read --group that is stationary for zooming and axially--.

Signed and Sealed this

Twenty-sixth Day of April, 1994

Attest:

BRUCE LEHMAN

*Attesting Officer*          *Commissioner of Patents and Trademarks*